United States Patent [19]

Kobori et al.

[11] Patent Number: 5,065,555
[45] Date of Patent: Nov. 19, 1991

[54] ELASTO-PLASTIC DAMPER

[75] Inventors: Takuji Kobori; Shunichi Yamada; Shigeru Ban; Koji Ishii; Isao Nishimura; Masatoshi Ishida; Kuniaki Sato; Yasuo Takenaka; Shozo Maeda; Jun Tagami, all of Tokyo, Japan

[73] Assignee: Kajima Corporation, Tokyo, Japan

[21] Appl. No.: 439,087

[22] Filed: Nov. 21, 1989

Related U.S. Application Data

[62] Division of Ser. No. 140,307, Dec. 31, 1987, Pat. No. 4,901,486.

[30] Foreign Application Priority Data

| Mar. 6, 1987 [JP] | Japan | 62-51288 |
| Mar. 6, 1987 [JP] | Japan | 62-51289 |
| Mar. 6, 1987 [JP] | Japan | 261-51290 |
| Jul. 31, 1987 [JP] | Japan | 62-102360 |
| Jul. 31, 1987 [JP] | Japan | 62-192358 |
| Jul. 31, 1987 [JP] | Japan | 62-192359 |

[51] Int. Cl.$^5$ .................... E04B 1/98; E04H 9/02
[52] U.S. Cl. ................... 52/167 DF; 52/167 R; 248/548; 248/580; 248/638
[58] Field of Search ....... 52/167 R, 167 CB, 167 DF; 248/638, 548, 580; 403/41, 405.1, DIG. 3

[56] References Cited

U.S. PATENT DOCUMENTS

| 1,761,322 | 6/1930 | Wells | 52/167 R |
| 2,968,458 | 1/1961 | Moeller | 52/167 R |
| 4,187,573 | 2/1980 | Fyfe et al. | 52/167 RX |
| 4,499,694 | 2/1985 | Buckle et al. | 52/167 R |
| 4,527,365 | 7/1985 | Yoshizawa et al. | 52/167 R |
| 4,633,628 | 1/1987 | Mostaghel | 52/167 R |
| 4,713,917 | 12/1987 | Buckle et al. | 52/167 R |
| 4,766,708 | 8/1988 | Sing | 52/167 R |
| 4,826,128 | 5/1989 | Schmeller | 248/638 |
| 4,959,934 | 10/1990 | Yamada et al. | 52/167 R |

FOREIGN PATENT DOCUMENTS

| 200835 | 11/1984 | Japan | 248/638 |
| 155344 | 7/1987 | Japan | 52/167 |
| 141280 | 3/1960 | U.S.S.R. | 52/167 |
| 510577 | 6/1976 | U.S.S.R. | 52/167 |
| 1260450 | 9/1986 | U.S.S.R. | 52/167 |

Primary Examiner—John E. Murtagh
Assistant Examiner—Deborah McGann Ripley
Attorney, Agent, or Firm—James H. Tilberry

[57] ABSTRACT

An elasto-plastic damper is adapted to be used in a structure, such as a building and other facilities, for absorbing vibration energy created by earthquake tremors and other ground vibrations. The damper is a centrally bulged and generally cone-shaped hollow body of revolution so that its section modulus changes substantially porportional to a bending moment created in the damper body due to horizontal stresses, thus permitting a maximum degree of deformability. This elasto-plastic damper is compact in size and demonstrates a high degree of vibrational energy absorbability.

11 Claims, 21 Drawing Sheets

Response Shear Forces
---- original
——— accompanied by damper

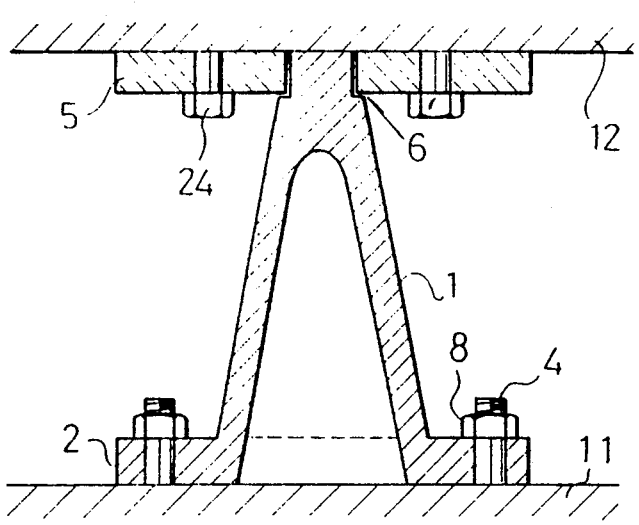
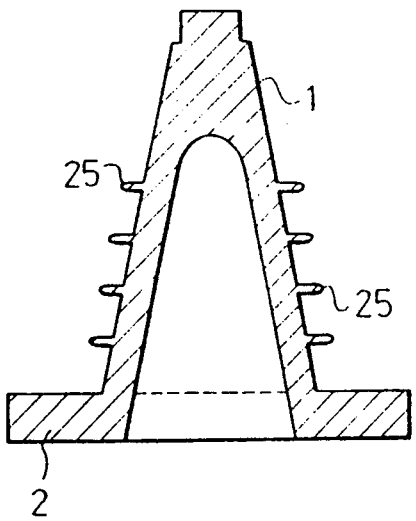
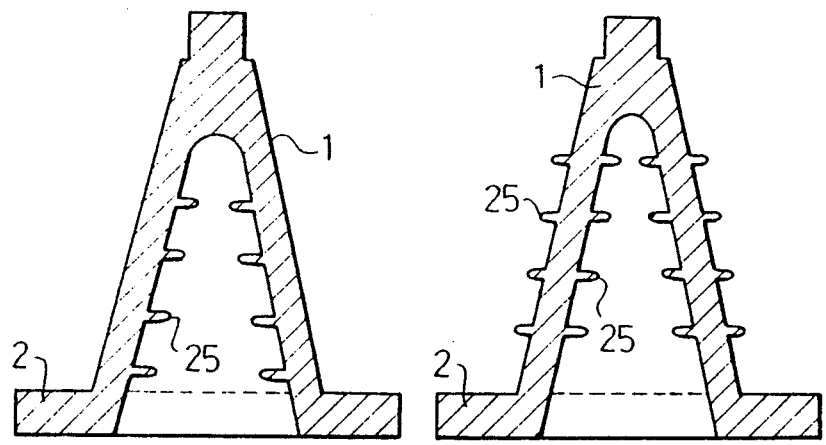
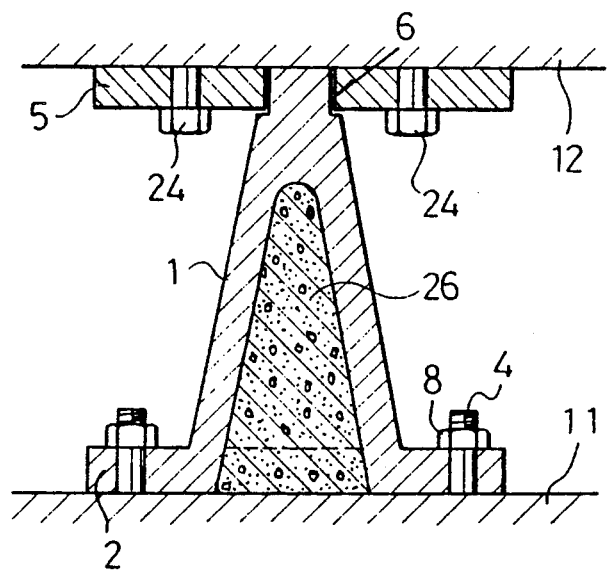

FIG. 18
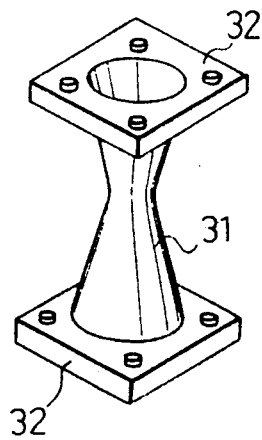
FIG. 19(a)
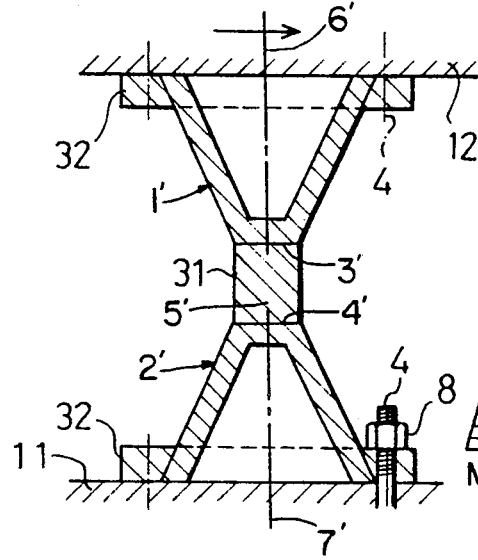
FIG. 19(b)
Mr
FIG. 20(a)
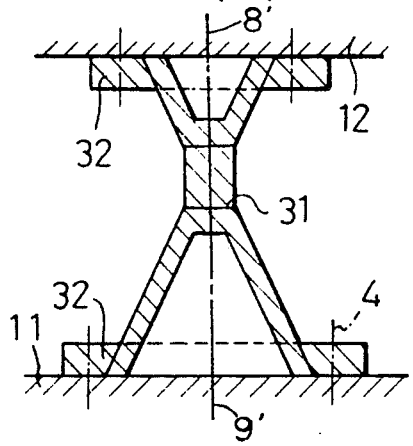
FIG. 20(b)
Mr
FIG. 21
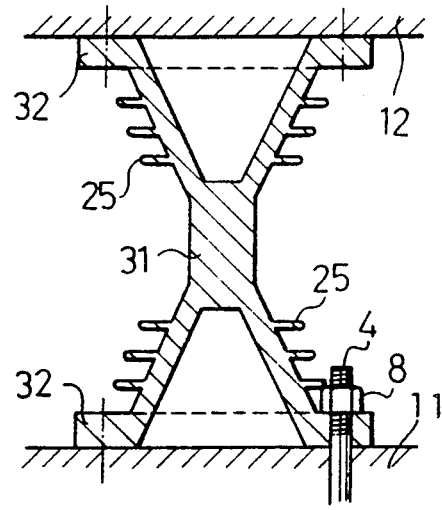
FIG. 22
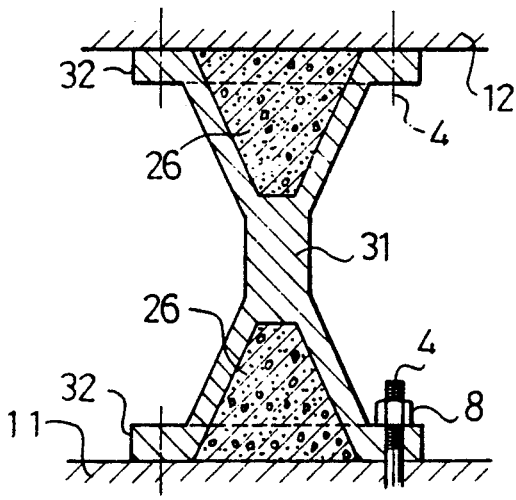

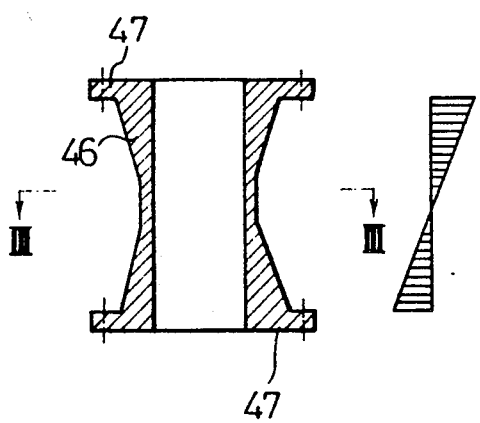 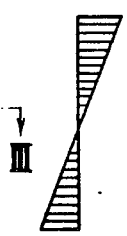 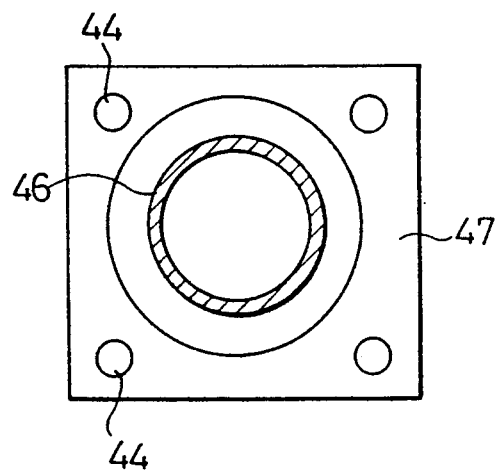
FIG. 33(a)   FIG. 33(b)   FIG. 34
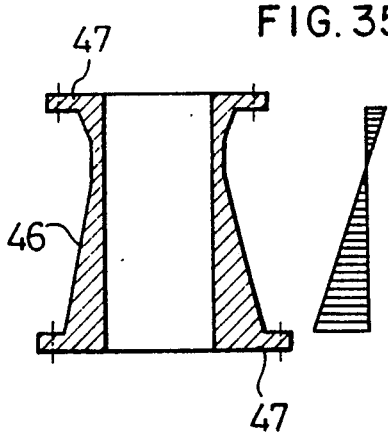 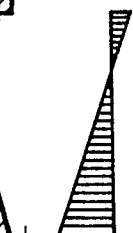 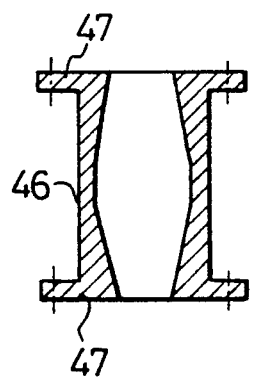 
FIG. 35(a)   FIG. 35(b)   FIG. 36(a)   FIG. 36(b)

FIG. 44(a) FIG. 44(b) FIG. 45(a) FIG. 45(b)
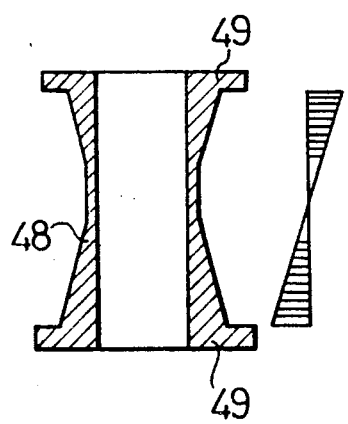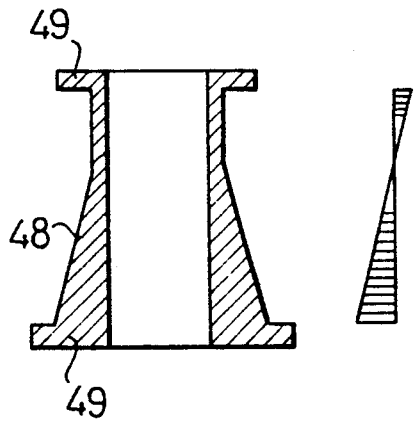
FIG. 46   FIG. 47
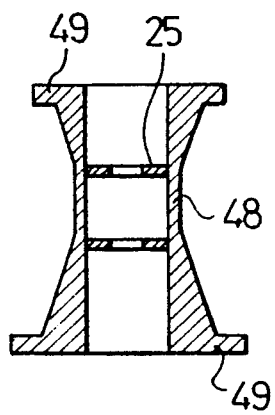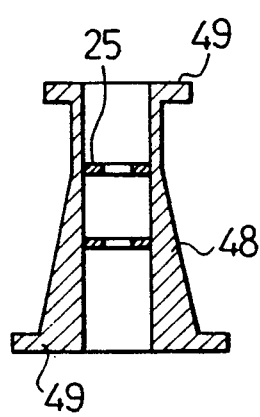
FIG. 48   FIG. 49
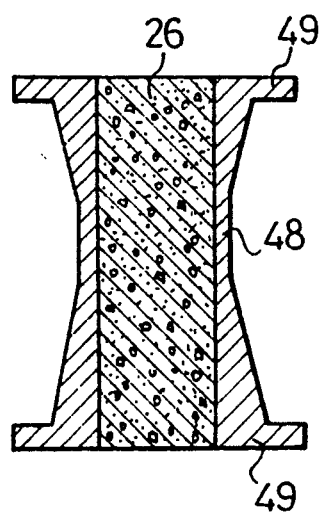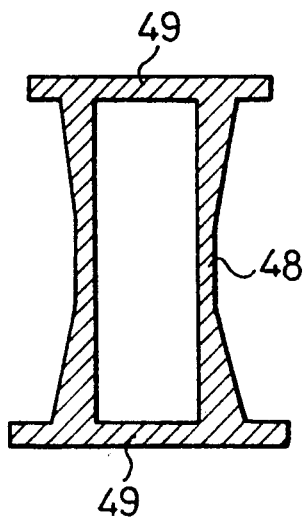

FIG.66(a) FIG.66(b) FIG.66(c)
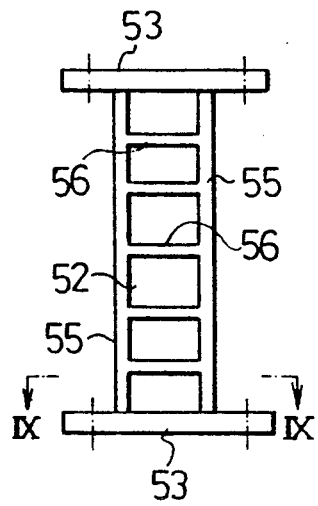 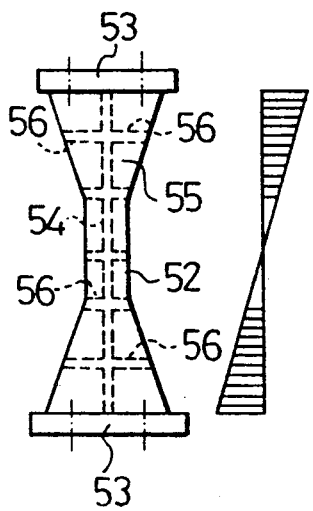 
FIG.67
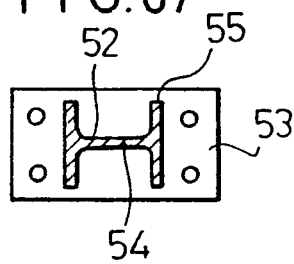
FIG.68(a) FIG.68(b) FIG.69(a) FIG.69(b)
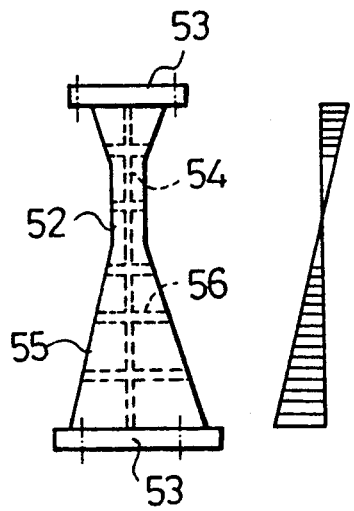 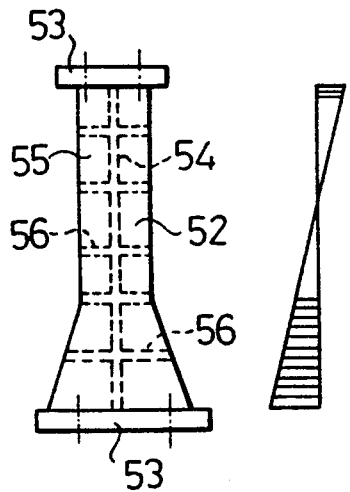

FIG.70(a) FIG.70(b)
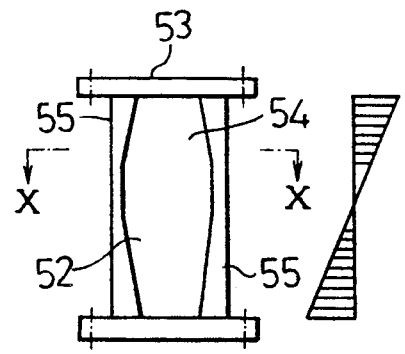
FIG.71
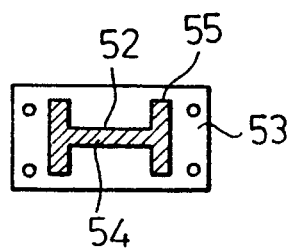
FIG.72(a) FIG.72(b) FIG.73(a) FIG.73(b)
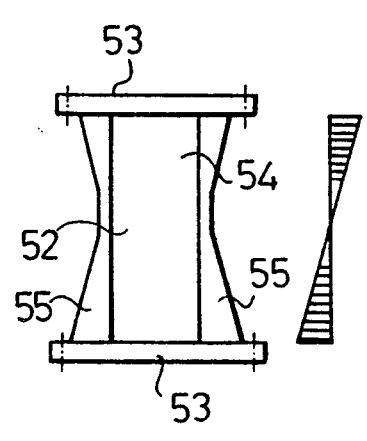 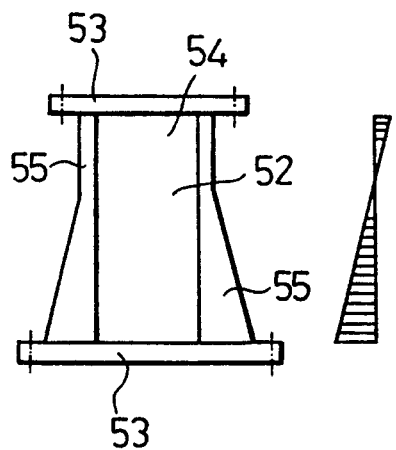

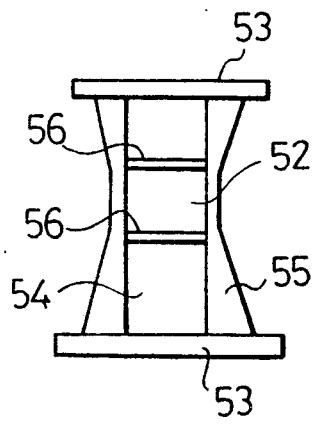
FIG.74
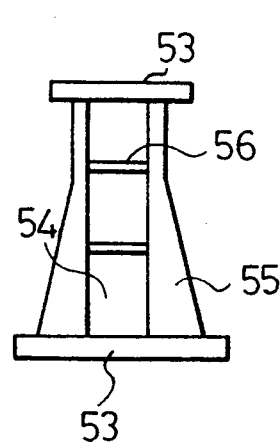
FIG.75
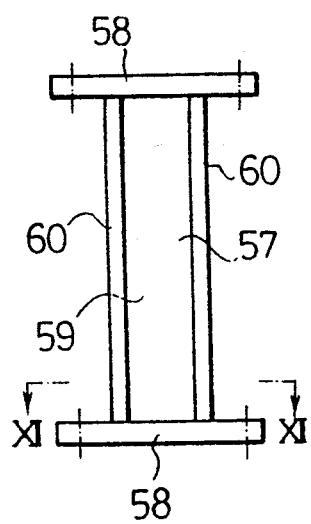
FIG.76(a)
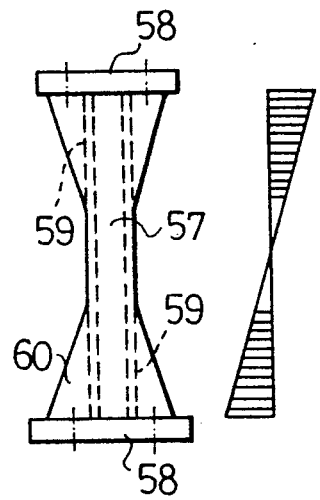
FIG.76(b)
FIG.76(c)
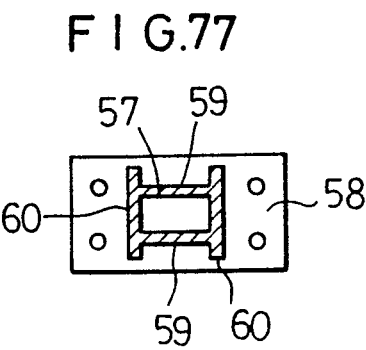
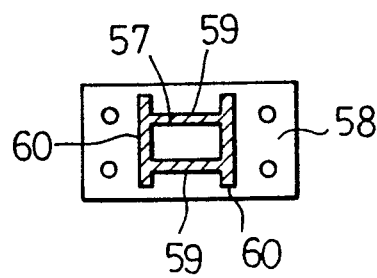
FIG.77
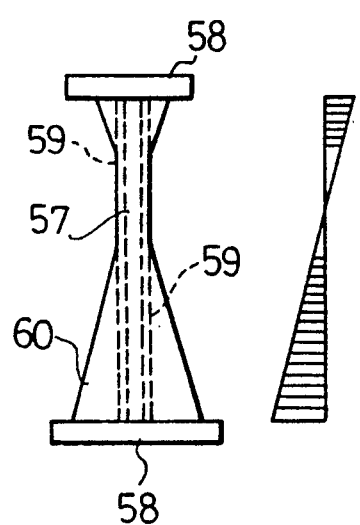
FIG.78(a) FIG.78(b)
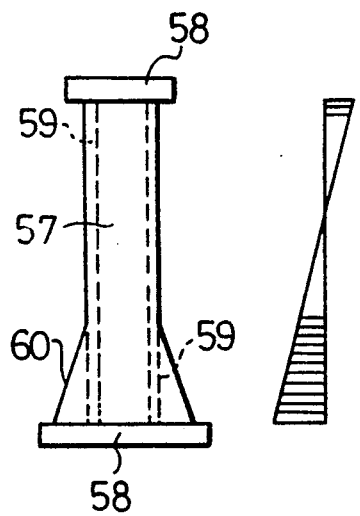
FIG.79(a)
FIG.79(b)

FIG.80  FIG.81
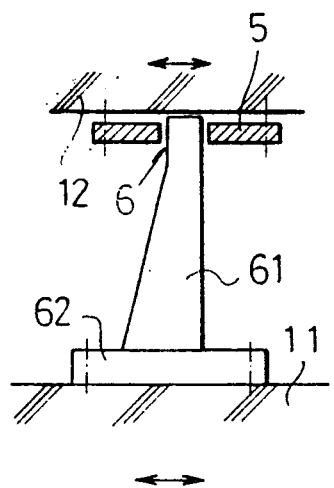
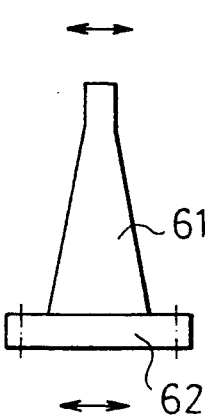
FIG.82  FIG.83  FIG.84
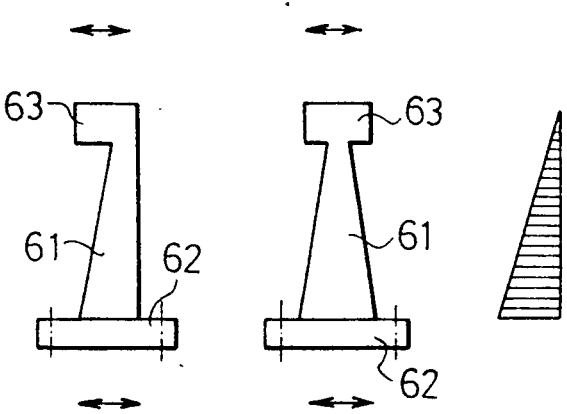
FIG.85  FIG.86  FIG.87  FIG.88  FIG.89
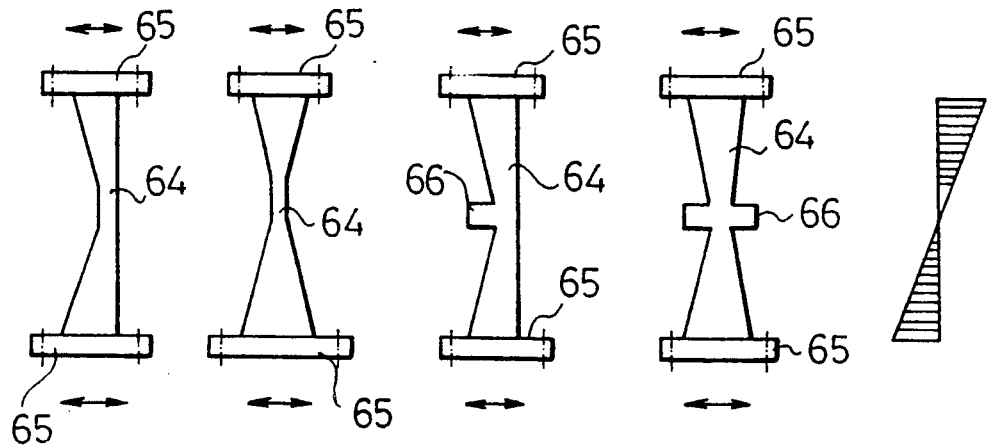

FIG.90(a) FIG.90(b) FIG.90(c)
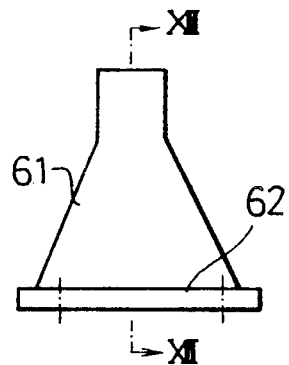 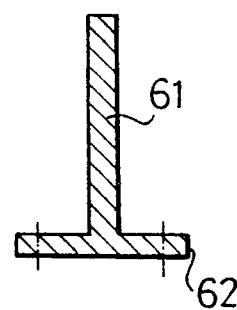 
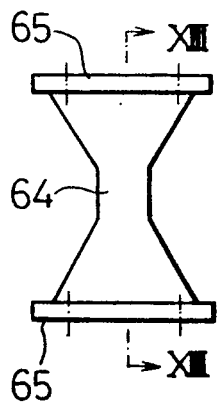 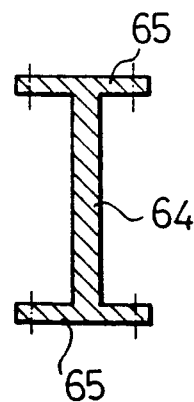 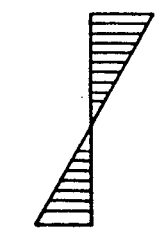
FIG.91(a) FIG.91(b) FIG.91(c)

ELASTO-PLASTIC DAMPER

This is a division of application Ser. No. 07/140,307, filed Dec. 31, 1987 U.S. Pat. No. 4,901,486.

BACKGROUND OF THE INVENTION

1. Field of the Invention

This invention relates to an elastro-plastic damper for absorbing vibration energy which a structure such as a building and facilities possibly receives from earthquake motions and ground vibrations.

2. Description of the Prior Art

A typical application of elasto-plastic dampers to a structure such as a building and facilities is a vibration isolation mechanism, and various shapes of elasto-plastic dampers have hitherto been proposed. Generally, this vibration isolation mechanism comprises multilayer rubber supports, and dampers, etc. which are disposed between the foundation and the upper structure of the building in order to reduce vibrations of the upper structure which are possibly created by earthquake motions and other ambient vibrations. NIKKEI ARCHITECTURE issued Dec. 30, 1985 by Nikkei-McGraw-Hill Inc. discloses various kinds of vibration isolation mechanisms, some of which are still under research. This publication also discloses a variety of types of dampers for vibration isolation mechanism, such as a viscous damper employing a viscous substance (asphalt silicone oil), a cylinder-type oil damper, an elasto-plastic damper employing a soft steel rod, a coil-type elasto-plastic damper, an elasto-plastic damper having a support as a guide for deformation of a steel rod, and a damper having a steel rod built in a multilayer rubber support.

However, oil dampers and viscous dampers require maintenance and are difficult to design, with which so much high degree of energy absorbability cannot be expected. Particularly, the oil damper has the limited directional property. Also with the prior elasto-plastic dampers using a soft or rigid steel rod, so much high degree of energy absorbability cannot be expected. The prior elasto-plastic dampers are complex in shape, large-sized and difficult to design.

SUMMARY OF THE INVENTION

It is therefore an object of the present invention to provide an elasto-plastic damper which is compact in size and hence easy to handle and which can demonstrate a high degree of energy absorbability.

An elasto-plastic damper according to the present invention is adapted to be disposed between a pair of confronting components of a structure. The body of this damper is elasto-plastically deformable, in response to relative motions due to horizontal vibrations by earthquake, to absorb vibration energy so that the entire structure is prevented from being deformed severely or broken. The damper comprises a body and one or more base plates disposed on a bottom portion and/or an apex of the body. In order to demonstrate a maximum degree of energy absorbability, the shape of this elasto-plastic damper body is such that a section modulus of the body varies rectilinearly in conformity with a bending moment gradient created in the damper by external forces. Accordingly this damper body yields substantially uniformly to deform elasto-plastically.

In a basic form of the present invention in which one end of the elasto-plastic damper is fixed and the other end of the damper is restricted in horizontal motions, the damper includes, as shown in FIG. 1, a centrally bulged cone-shaped hollow body of revolution such that a section modulus varies rectilinearly and vertically so as to be zero at the apex and maximum at the bottom. As bending moment created in the elasto-plastic damper also varies rectilinearly, the entire body of the damper yields substantially simultaneously to deform plastically. Practically, however, because of the thickness, manufacturing error and other factors, as the horizontal forces increase, the damper body yields initially at one point, then the yielding region progressively expands vertically and also circumferentially, and finally the entire damper body yields.

FIG. 6 is a diagram schematically showing a load-deformation curve representing a deformation characteristic of the elasto-plastic damper of the present invention. FIG. 7 is a diagram showing hysteresis curves representing energy absorbability. Thus the damper of the present invention has a large degree of elasto-plastic deformability and a very large degree of energy absorbability.

In an approximate form, the damper may includes a cone-shaped (practically frustum shape) hollow body of revolution.

In an another form of the present invention in which, as shown in FIGS. 18 and 19, the damper includes a hollow body of revolution having a shape of two cones joined together at their apices, and a pair of base plates disposed one each of opposite ends of the body.

Further, the damper body may be a tube of circular cross section, a tube of rectangular cross section, or a pyramid. One end of the body may be fixed, with the other end restricted in horizontal motions, or the opposite ends of the body may be fixed. The thickness of each cross section may vary in conformity with bending moment. The damper body may have a rectangular cross section, and the thickness of the cross section may very. Or the damper may have a body of H-shaped cross section or a plate-like body, and the distance between flanges, the width of the flanges, thickness of the plate, or width of the plate may vary so that a section modulus in each cross section varies as approximately rectilinearly as possible in conformity with bending moment; this form of damper is directional and is hence restricted in direction of use. Every cross section of the elasto-plastic damper yields substantially simultaneously to demonstrate a large degree of deformability.

Although the elasto-plastic damper is usually made of metal such as steel, it may be otherwise made of plastics and other material which has a suitable degree of elasto-plastic deformability in view of object, use, corrossiveness easiness of manufacturing, etc.

Though the elasto-plastic damper is used in a vertical posture in the illustrated embodiments, it may be used in a horizontal posture to reduce vertical vibrations.

BRIEF DESCRIPTION OF THE DRAWINGS

The foregoing and other objects and features of the invention will become apparent from the following description of preferred embodiments of the invention with reference to the accompanying drawings, in which:

FIGS. 13 through 17 are vertical cross-sectional views of various modifications of the elasto-plastic damper, respectively;

FIG. 18 is a perspective view of one example of a basic structure of the elasto-plastic damper in which a pair of base plates are disposed on opposite ends of a damper body;

FIG. 19(a) is a vertical cross-sectional view of the damper of FIG. 18;

FIG. 19(b) is a diagram showing resisting moment of the damper of FIG. 9(a);

FIG. 20(a) is a vertical cross-sectional view of a modified damper;

FIG. 20(b) is a diagram showing resisting moment of the modified damper of FIG. 20(a);

FIGS. 21 and 22 are vertical cross-sectional views showing modifications of the damper of FIG. 19(a), respectively;

FIG. 33(a) is a vertical cross-sectional view of a cylinder-type elasto-plastic damper with its opposite ends fixed;

FIG. 33(b) is a diagram showing resisting moment of the damper of FIG. 33(a);

FIG. 34 is a cross-sectional view taken along line III—III of FIG. 33(a);

FIG. 35(a) is a vertical cross-sectional view of another modification of the cylinder-type elasto-plastic damper;

FIG. 35(b) is a diagram showing resisting moment of the damper of FIG. 35(a);

FIG. 36(a) is a vertical cross-sectional view of a further modification of the cylinder-type damper;

FIG. 36(b) is a diagram showing resisting moment of the damper of FIG. 36(a);

FIG. 44(a) is a vertical cross-sectional view of a modification of the damper of FIG. 42(a);

FIG. 44(b) is a diagram showing resisting moment of the damper of FIG. 44(a);

FIG. 45(a) is a vertical cross-sectional view of another modification of the damper of FIG. 42(a);

FIG. 45(b) is a diagram showing resisting moment of the damper of FIG. 45(a);

FIGS. 46 through 49 are vertical cross-sectional views of modifications of the damper of FIG. 42(a), respectively;

FIG. 66(a) is a side elevational view similar to FIG. 62(a), but showing an elasto-plastic damper having horizontal ribs;

FIG. 66(b) is a front elevational view of FIG. 66(a);

FIG. 66(c) is a diagram showing resisting moment of the damper of FIG. 66(a);

FIG. 67 is a cross-sectional view taken along line IX—IX of FIG. 66(a);

FIG. 68(a) is a front elevational view of a modification of the damper of FIG. 66(a);

FIG. 68(b) is a diagram showing resisting moment of the damper of FIG. 68(a);

FIG. 69(a) is a front elevational view of another modification of the damper of FIG. 66(a);

FIG. 69(b) is a diagram showing resisting moment of the damper of FIG. 69(a);

FIG. 70(a) is a front elevational view of an elasto-plastic damper of H-shaped cross section having flanges of varying thickness;

FIG. 70(b) is a diagram showing resisting moment of the damper of FIG. 70(a);

FIG. 71 is a cross-sectional view taken along line X—X of FIG. 70(a);

FIG. 72(a) is a front elevational view of a modification of the damper of FIG. 70(a);

FIG. 72(b) is a diagram showing resisting moment of the damper of FIG. 72(a);

FIG. 73(a) is a front elevational view of another modification of the damper of FIG. 70(a);

FIG. 73(b) is a diagram showing resisting moment of the damper of FIG. 73(a);

FIGS. 74 and 75 are front elevational views of further modifications of the damper of FIG. 70(a), respectively;

FIG. 76(a) is a side elevational view of an elasto-plastic damper having flanges of varying width and also a plurality of webs between the flanges;

FIG. 76(b) is a front elevational view of FIG. 76(b);

FIG. 76(c) is a diagram showing resisting moment of the damper of FIG. 76(a);

FIG. 77 is a cross-sectional view taken along line XI—XI of FIG. 76(a);

FIG. 78(a) is a front elevational view of a modification of the damper of FIG. 76(a);

FIG. 78(b) is a diagram showing resisting moment of the damper of FIG. 78(a);

FIG. 79(a) is a front elevational view of another modification of the damper of FIG. 76(a);

FIG. 79(b) is a diagram showing resisting moment of the damper of FIG. 79(a);

FIG. 80 is a front elevational view of an elasto-plastic damper in the shape of plate of varying thickness in which one end is fixed and the other end is restricted in horizontal motions;

FIGS. 81 through 83 are front elevational views of modifications of the damper of FIG. 80, FIG. 84 is a diagram showing resisting moment of the dampers of FIGS. 80 through 83;

FIG. 85 is a front elevational view of an elasto-plastic damper in the shape of a plate of varying thickness in which its opposite ends are fixed;

FIGS. 86 through 88 are front elevational views of modifications of the damper of FIG. 85, FIG. 89 is a diagram showing resisting moment of the dampers of FIGS. 85 through 88;

FIG. 90(a) is a front elevational view of an elasto-plastic damper in the shape of a plate of varying width in which its one end is fixed and the other end is restricted in horizontal motions;

FIG. 90(b) is a cross-sectional view taken along line XII—XII of FIG. 90(a);

FIG. 90(c) is a diagram showing resisting moment of the damper of FIG. 90(a);

FIG. 91(a) is a front elevational view of an elasto-plastic damper in the shape of a plate of varying width in which its opposite ends are fixed;

FIG. 91(b) is a cross-sectional view taken along line XIII—XIII of FIG. 90(a); and FIG. 91(c) is a diagram showing resisting moment of the damper of FIG. 91(a).

DESCRIPTION OF THE PREFERRED EMBODIMENTS

Figure 1:
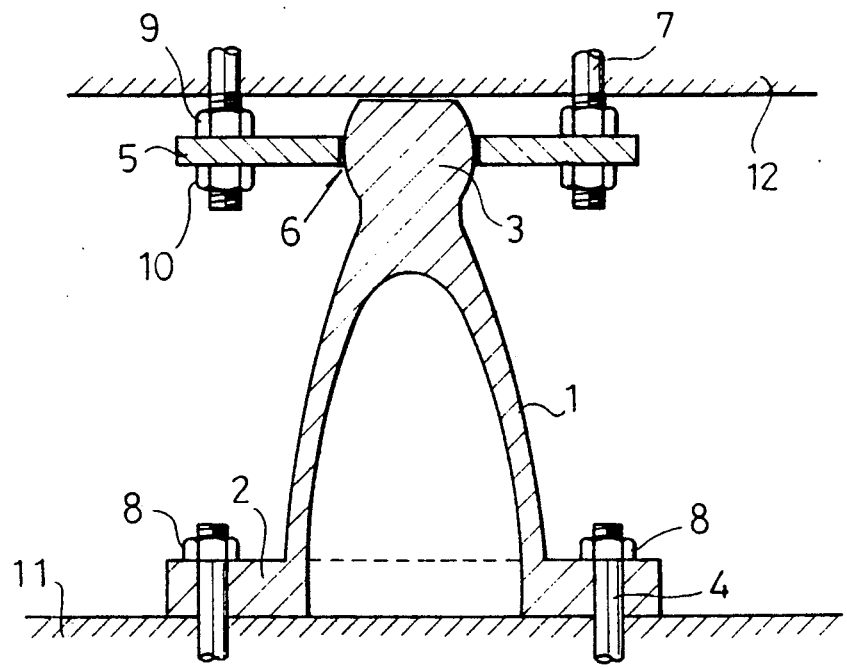
FIG. 1 is a vertical cross-sectional view of one example of a basic structure of an elasto-plastic damper according to the present invention.

FIG. 1 shows a basic structure of one embodiment of an elasto-plastic damper according to the present invention.

The elasto-plastic damper 1 comprises a centrally bulged and cone-shaped hollow body of revolution, and a base plate 2 disposed on a bottom of the body and fixed by a plurality of anchoring bolts 4 to one 11 of a pair of spaced apart structural components. The body has at its apex a spherical head 3, which is restricted in horizontal motion by a connecting plate 5 fixed to the other structural component 12. The connecting plate 5 is secured to the other structural component 12 by a plurality of anchoring bolts 7 and has an aperture 6, through which the head 3 of the damper 1 extends. With this arrangement, only horizontal forces of the other structural component 11 at the time of earthquake is transmitted to the elasto-plastic damper 1 via the connecting plate 5 so that no bending moment is created in the head 3 of the damper 1.

Figure 2A:
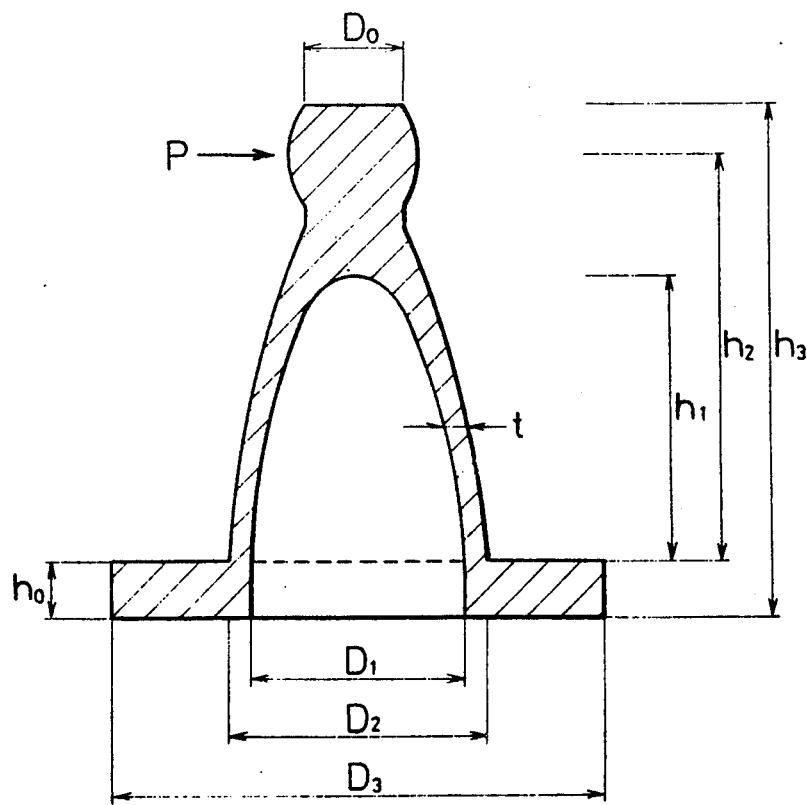
FIG. 2(a) is a vertical cross-sectional view showing various sizes of the elasto-plastic damper.
Figure 8A:
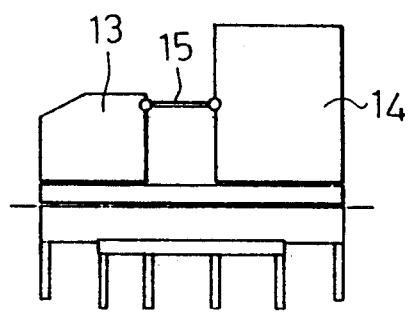
FIG. 8(a) is an elevational view showing one example in which the elasto-plastic damper is used for the joint between two buildings having different vibration characteristics.
Figure 8B:
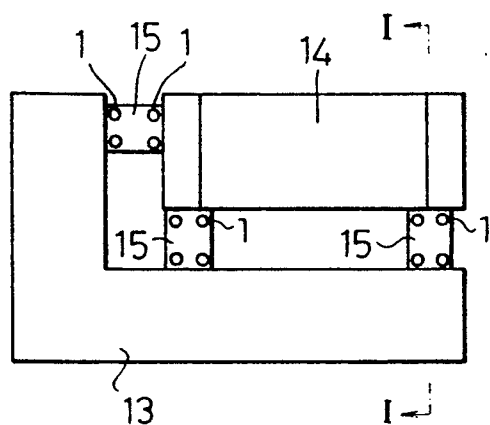
FIG. 8(b) is a plan view of FIG. 8(a)
Figure 8C:
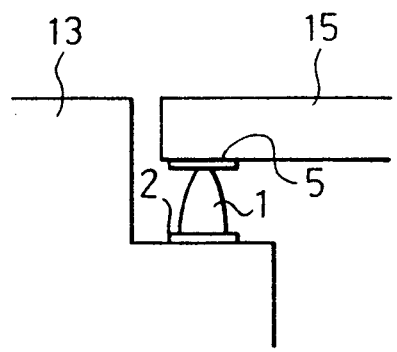
FIG. 8(c) is a cross-sectional view taken along line I—I of FIG. 8(b)

FIG. 2(a) shows various measurements of the elasto-plastic damper in the case the latter is used as the joints in a building such as shown in FIGS. 8(a) to FIG. 8(c).

The damper is made of steel (SS41). Parameters of the damper are: $D_0 = 70$ mm, $D_1 = 140$ to $150$ mm, $D_2 = 180$ mm, $D_3 = 345$ mm, $t = 15$ to $20$ mm, $h_0 = 40$ mm, $h_1 = 200$ mm, $h_2 = 285$ mm, and $h_3 = 360$ mm.

Figure 2B:
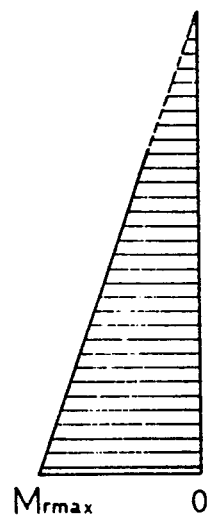
FIG. 2(b) is a diagram showing resisting moments.

In this example, the damper is designed so that a section modulus of each cross section of the elasto-plastic damper body varies so that a resisting moment varies rectilinearly as shown in FIG. 2(b). Because the cross section of the body is enlarged at the head, the actual change of resisting moment near the head portion is not rectilinear. However, the bending moment created at the head portion is small and hence may be neglected.

Figure 4:
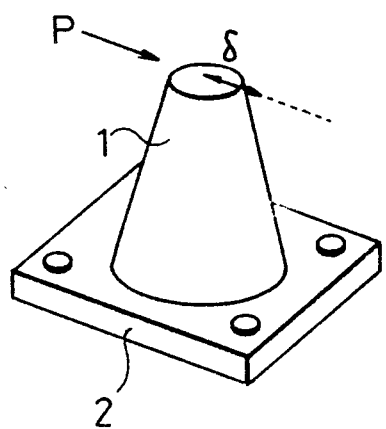
FIG. 4 is a perspective view of the damper, showing the relation between external force and deforming and bending moment.
Figure 5:
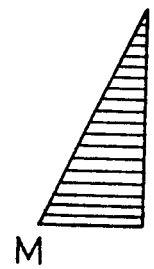
FIG. 5 is a diagram showing bending moments.

When horizontal force P is exerted on the apex of the elasto-plastic damper fixed to the base plate as shown in FIG. 4, a bending moment of the damper body is as shown in FIG. 5.

A resisting moment Mr of the elasto-plastic damper body is expressed by the following equation:

$$M_r = \sigma_b Z$$

where $\sigma_b$ is angle of bending stress, and Z is a section modulus.

Since the damper body is in the shape of a hollow cone, the section modulus increases progressively from the bottom toward the apex so that the angle of bending stress is constant, thus providing a beam of uniform strength. Therefore, with this elasto-plastic damper, as the horizontal force acting on the apex of the damper body increases, one point of the damper body yields, and then this yielding region progressively expands vertically and also circumferentially. Finally, the entire damper body yields.

Figure 3:
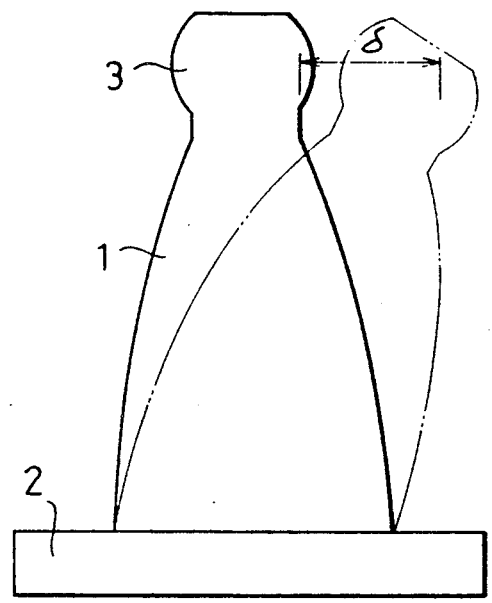
FIG. 3 is a front elevational view of the elast-plastic damper, showing the manner in which the damper deforms.
Figure 6:
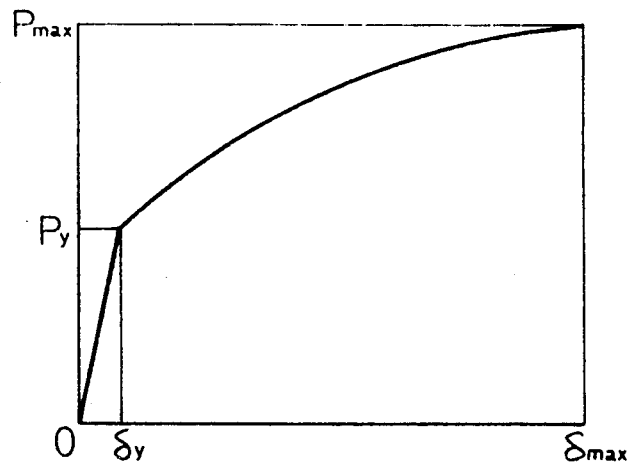
FIG. 6 is a diagram showing a load-deformation curve representing a deformation characteristic of the elasto-plastic damper.

FIG. 6 shows a diagram illustrating the relationship between the horizontal force P and the flexure $\delta$(FIG. 3) created in the apex of the damper body, where $P_y$ is a load when the damper body yields at one point, $\delta_y$ is a flexure at that time, $P_{max}$ is a load when the damper body yields entirely, and $\delta_{max}$ is a flexure at that time.

In the example shown in FIG. 2, the following experimental results were obtained: $P_y = 33.6$ tons, $P_{max} = 79.4$ tons, $\delta_y = 1.9$ mm, $\delta_{max} \geq 140$ mm. Because the difference between $\delta_y$ and $\delta_{max}$ is very large as compared with the difference between $P_y$ and $P_{max}$, it can be noted that the elasto-plastic damper of the present invention has a remarkably great degree of plastic deformability. At that time, the resisting moment at the lower end of the damper body in FIG. 2 is $M_{rmax} = 22.6$ tm.

Figure 7:
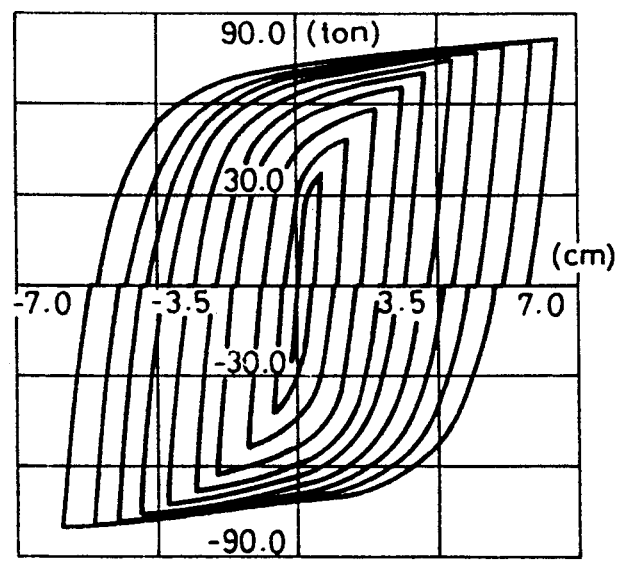
FIG. 7 is a diagram showing hysteresis curves representing energy absorbability of the elasto-plastic damper.

FIG. 7 shows the hysteresis curves of a single elasto-plastic damper, from which it can be noted that the individual damper has a considerable degree of energy absorbability.

FIGS. 8(a), 8(b) and 8(c) show an example in which the elasto-plastic dampers 1 of the present invention are employed for the respective joints 15 between two buildings 13, 14 having different vibration characteristics. (This damper is hereinafter referred to as joint damper) Specifically, the elasto-plastic dampers 1 are disposed at the joints 15 between two structurally separated buildings 13, 14 for absorbing vibration energy by utilizing the difference in motion (vibration) between the two buildings 13, 14. This building comprises an eight-story house 13 of L-shaped plan and a five-story house 14 of rectangular shaped plan. At the height of 5th story, the two houses 13, 14 are joined by three joints 15, two at the opposite ends of the L shape and one at the midportion of the L shape. A total of twelve elasto-plastic dampers 1 are used four for each joint 15.

Figure 9:
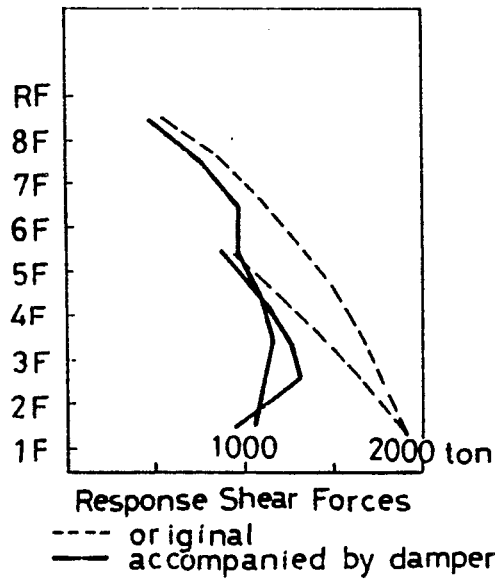
FIG. 9 is a diagram showing analysis results of reducing effect of response shear forces in the example of FIGS. 8(a), 8(b) and 8(c)

FIG. 9 shows the analysis results of reducing effect of response shear forces at each story in the example of FIGS. 8(a), 8(b) and 8(c). In FIG. 9, the phantom lines represent the results of the experiments in which the houses resisted against earthquake force independently with no joint dampers, while the solid lines represent the results of the experiments in which the joint dampers are mounted between the houses. From these analysis results, it is found that the reducing effect of response shear forces at the lower stories is great (as calculated under the condition that input earthquake wave was El Centro wave and input acceleration was 100 gal).

The joint dampers of the present invention can reduce response shear forces sharply, compared with expansion joints, which are conventionally used as joints between two houses having different vibration characteristics. In the case expansion joints are employed, covering arrangements for the joints is necessarily complex in order to absorb large motions of the joints. With the joint dampers of the present invention, it is possible to simplify the covering arrangements.

Figure 10:
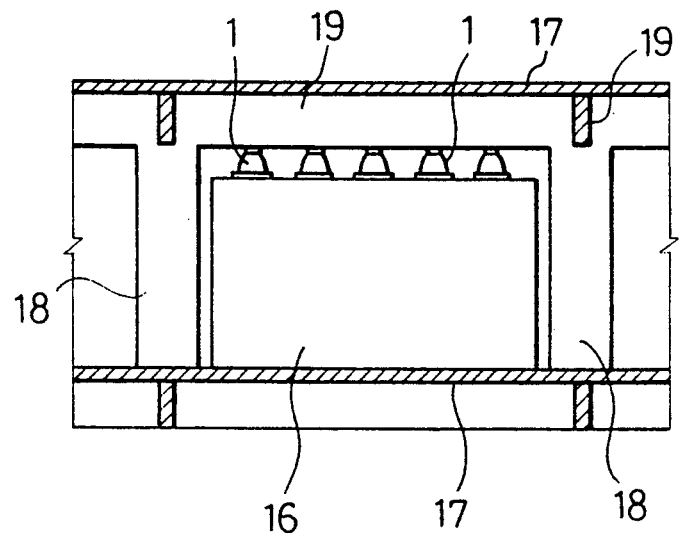
FIGS. 10 and 11 are vertical cross-sectional views showing examples in which the elasto-plastic dampers are used in a wall damper system.

FIG. 10 shows a wall damper system in which a plurality of elasto-plastic dampers 1 are mounted between the lower surface of a beam 19 and the upper surface of a wall 16 of a building frame and the wall 16 and the beam 19 are connected with each other through the dampers 1 to absorb inter-layer deflection due to horizontal forces, so that deformation is not created in the wall 16. The amount of horizontal force exerting on the wall at the time of earthquake is determined by the degree of energy absorbability of the elasto-plastic damper 1; if the wall 16 has a good degree of strength greater than such amount of horizontal force, the wall 16 is free from collapsing. Therefore, the wall 16 requires only an adequate degree of strength and does not require deformability.

After a sizeable earthquake, only the elasto-plastic dampers 1 may be replaced with new ones, with the wall 16 remaining undamaged. The same thing can be said in the case of the joint damper system mentioned above.

Unlike the conventional vibration isolation mechanism with which durability (strength) is the first consideration, this wall damper system concentrically consumes energy as earthquake input in the building. Using this wall damper system, it is possible to reduce a response of the building, thus enabling an economical design of the vibration isolation building. Further, since almost all of energy at the time of earthquake is absorbed by the wall damper system, the design of vibration isolation mechanism can be simplified, thus increasing a degree of freedom in designing the structure. The elasto-plastic damper of the present invention is very compact so that there is only a small two-dimentional and three-dimentional restriction compared with a brace and a wall, which are conventional vibration-resisting elements, thus causing a sharply increased degree of freedom in designing a building.

Figure 11:
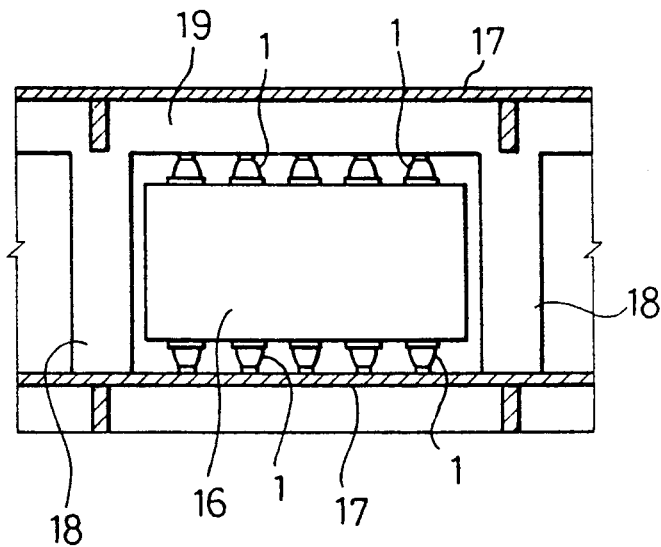

FIG. 11 shows a wall damper system in which a plurality of elasto-plastic dampers 1 are mounted not only between the lower surface of the beam 19 and the upper surface of the wall 16 of the building frame but also between the upper surface of a slab 17 and the lower surface of the wall 16 to connect the beam 19 or slab 17 with the wall 16 through the dampers 1. Though there is no illustration in the drawings, the dampers 1 may be mounted only between the upper surface of the slab 17 and the lower surface of the wall 16.

Figure 12:
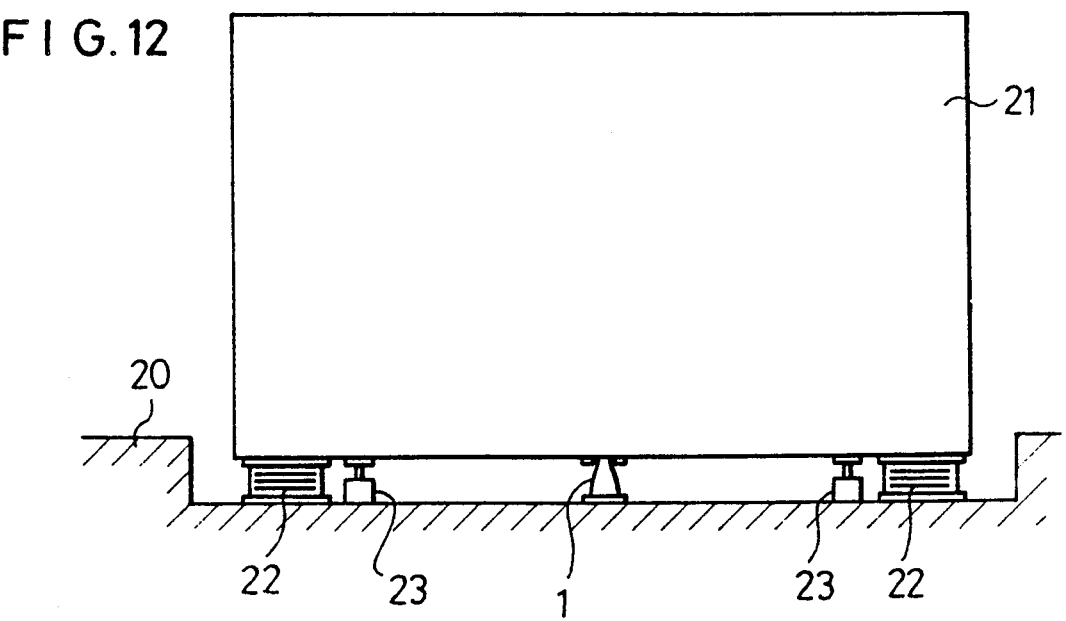
FIG. 12 is an elevational view showing an example in which the elasto-plastic damper is applied to a vibration isolation structure.

FIG. 12 schematically shows an example in which the elasto-plastic damper 1 is employed in a vibration isolation mechanism using multi-layer rubber supports.

Specifically, the multi-layer rubber supports 22 and the elasto-plastic damper 1 are mounted between a base structure 20 of a building and an upper building structure 21 for reducing vibrations (horizontal vibration) of the upper building structure 21 due to earthquake motions and also for reducing micro vibrations due to ground vibrations by traffic. The elasto-plastic damper 1 serves to prevent the building from vibrations due to wind and to attenuate vibrations due to a big earthquake. The elasto-plastic damper 1 deformed by the big earthquake may be replaced with a new one. Designated 23 in FIG. 12 are rocking control devices or buffers.

FIG. 13 shows the elasto-plastic damper 1 similar to that of FIG. 1 but having a simple cone-shaped body.

The body of the elasto-plastic damper 1 is integral with the base plate 2 extending around the damper body and has a cavity. The apex of the damper to which horizontal forces are to be applied has a thickness larger than the thickness of the damper body.

The base plate 2 has a plurality of holes through which a plurality of anchoring bolts 4 attached to one structural component 11 respectively extend. A nut 8 is threadedly mounted on the upper end of each anchoring bolt 4. Thus the base plate 2 is fixed to the one structural component 11. A connecting plate 5 is attached to the other structural component 12 and has a central aperture 6 in which the apex of the damper 1 is inserted so as to be restricted in horizontal motions. The connecting plate 5 is fixed to the other structural component 12 by bolts 24.

FIGS. 14 to 16 show modifications of the elasto-plastic damper of FIG. 13, respectively. Each modified damper 1 has on its peripheral surface a plurality of horizontally extending fins 25 which serves to make the body resistant against elastic and plastic buckling and also serves to radiate heat created by plastic deformation. The fins 25 may be on the outer peripheral surface of the damper body as shown in FIG. 14, or may be on the inner surface of the damper body as shown in FIG. 15, or may be on body the inner and outer surfaces of the damper body as shown in FIG. 16.

FIG. 17 shows the elasto-plastic damper 1 in which the cavity of the body is filled with concrete 26 which serves to increase the buckling strength of the damper body and also serves to absorb heat created by plastic deformation of the damper body. By cracking of the concrete 26 and by friction of the cracked concrete, it is possible to improve energy absorbability. Alternatively, the cavity of the damper body may be filled with lead which serves to improve energy absorbability by plastic deformation of the lead.

A frustum is defined by Webster's New World Dictionary as the figure formed when the top of a cone is cut off by a plane parallel to the base. If the cone is a right angle cone, i.e., vertical axis and horizontal base, any horizontal section through the cone will describe a circle concentric with all other circular sections of the cone. The line passing through the centers of concentric circles of the cone, such as the top and the base, define the axis of the cone.

FIGS. 18 through 22 illustrate a variety of pairs of right angle frusta concentrically joined at their apices.

Referring to FIG. 19(a), a pair of frusta 1' and 2' are joined at their apices 3' and 4' by a cylindrical member 5'. The axis 6' of frustum 1' is in axial alignment and is equal in length to axis 7' of frustum 2'. This analysis is also applicable to FIGS. 18, 21, and 22.

FIG. 20(a) discloses axes of unequal length, wherein axis 8' is shown to be shorter than axis 9'.

FIGS. 18 and 19 show a modified elasto-plastic damper 31 having a pair of top and bottom plates 32 and 32A, respectively disposed on both the upper and lower ends of the body. The damper body is solid only at its small-diameter midportion and hollow at the remaining portions. The top and bottom plates 32 are adapted to be fixed to a pair of spaced apart structural components 11, 12. With this arrangement, the bending moment by horizontal forces varies rectilinearly so that its value is zero at the midportion of the damper body, positive at the upper half of the damper body, and negative at the lower half of the damper body. The damper body has a shape of a pair of hollow frusta joined together at their apices and demonstrates a resisting moment as shown in FIG. 19(b). Though the change of the resisting moment is not rectilinear at the solid small-diameter midportion of the body, it is negligible because the bending moment also is small. If its wall thickness is constant, the body of the elasto-plastic damper 31 is in the shape of a slightly bulged cone rather than a precise cone. In the resisting moment diagram of FIG. 19(b), horizontal lines indicate portions where the yielding region reaches by the increase of the horizontal force substantially simultaneously therewith.

The top and bottom plates 32, like the base plate of the foregoing embodiments, has a plurality of holes through which a plurality of anchoring bolts 4 extend respectively. The nut 8 is threadedly mounted on the distal end of each anchoring bolt 4. Thus the two top and bottom plates 32 and 32A are fixed to the respective structural components 11, 12.

FIG. 20(a) shows another modified elasto-plastic damper 31 in which the small-diameter solid portion is disposed slightly above the center and which demonstrates a resisting moment as shown in FIG. 20(b).

FIG. 21 shows a further modified elasto-plastic damper 31 which, like the damper of FIG. 14, has a plurality of fins 25 extending horizontally from the outer peripheral surface of the body. Alternatively, these fins 25 may be on the inner peripheral surface of the damper body or on both the inner and outer peripheral surfaces of the damper body.

FIG. 22 is a still further modified elasto-plastic damper 31 in which, like the damper of FIG. 17, the cavity of the damper body is filled with concrete 26, which may be replaced with lead.

Figure 23:
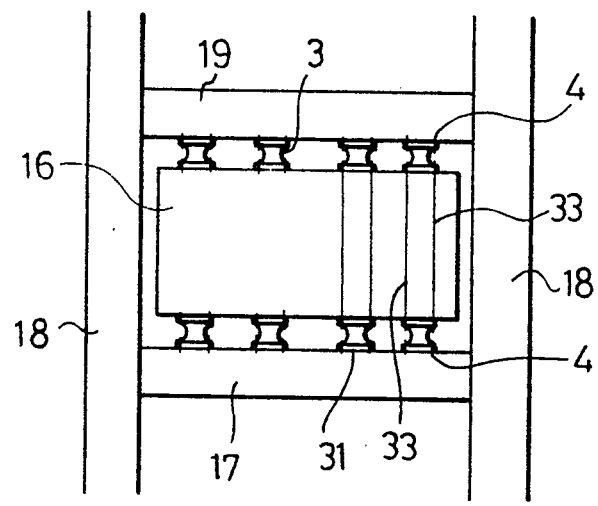
FIGS. 23 and 24 are elevational views showing examples in which the elasto-plastic dampers are used in the wall damper system, respectively.

FIG. 23 shows a wall damper system in which a plurality of elasto-plastic dampers 31 are mounted between the lower surface of the beam 19 of the building frame and the upper surface of the wall 16 and also between the upper surface of the slab 17 and the lower surface of the wall 16 to connect the beam 19 or slab 17 with the wall 16 through the dampers 31. The dampers 31 are fixed to the beam 19 by the anchoring bolts 4, and to the wall 16 by the anchoring bolts 4 or PC steel bars 33.

Figure 24:
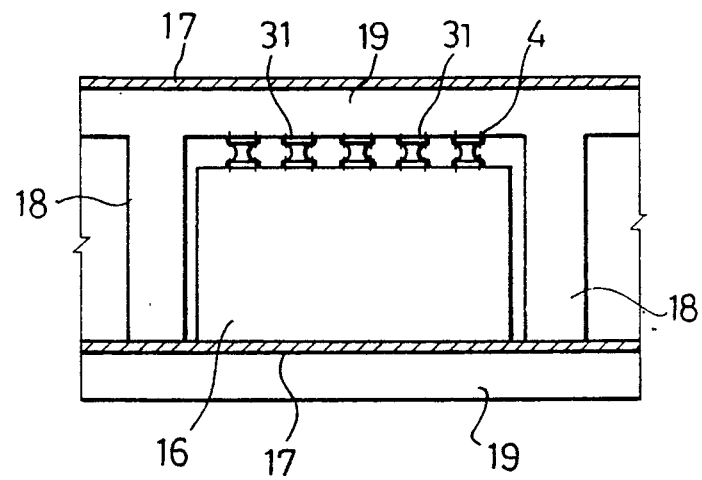

FIG. 24 shows a modified wall damper system in which a plurality of elasto-plastic dampers 31 are mounted only between the lower surface of the beam 19 and the upper surface of the wall 16 to connect the beam 19 and the wall 16 through the dampers 31.

Though there is no illustration in the drawings, the dampers 31 may be mounted only between the upper surface of the slab 17 and the lower surface of the wall 16.

Figure 25A:
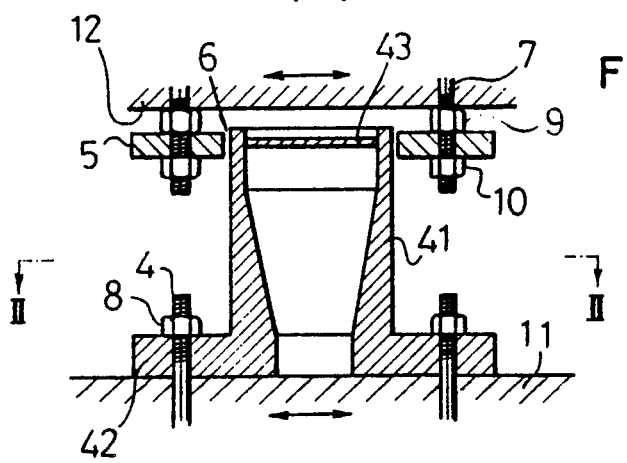
FIG. 25(a) is a vertical cross-sectional view showing a cylinder-type elasto-plastic damper.
Figures 25B, 26:
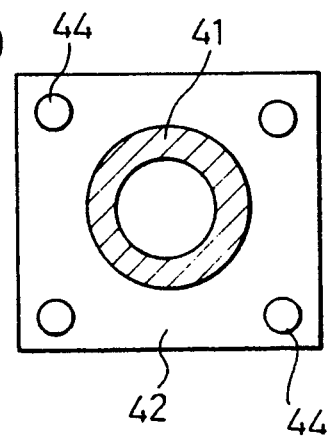
FIG. 25(b) is a diagram showing resisting moment of the damper of FIG. 25(a)
FIG. 26 is a cross-sectional view taken along line II—II of FIG. 25(a)
Figure 27A:
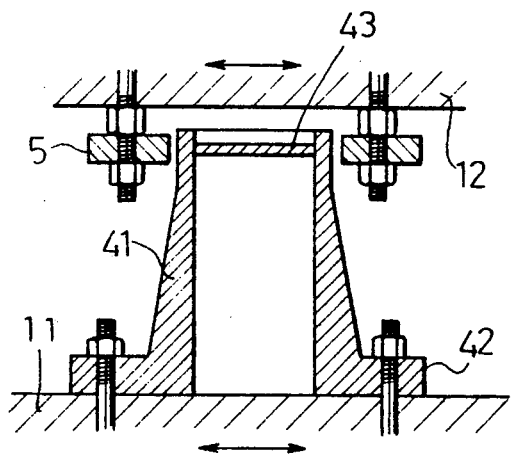
FIG. 27(a) is a vertical cross-sectional view showing a modification of the cylinder-type elasto-plastic damper.
Figure 27B:
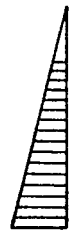
FIG. 27(b) is a diagram showing resisting moment of the damper of FIG. 27(a)

FIGS. 25(a) and 27(a) show elasto-plastic dampers 41 each comprising a cylindrical body and a base plate 42 disposed on one end of the body. The damper body has a varying wall-thickness increasing progressively toward the base plate 42. FIG. 26 is a cross-sectional view taken along line II—II of FIG. 25(a). In the example of FIG. 25(a), the damper body has a constant outer-diameter and a varying inner-diameter reducing progressively downwardly toward the base plate 42. To the contrary, in the example of FIG. 27(a), the damper body has a constant inner-diameter and a varying outer-diameter increasing progressively downwardly toward the base plate 42. In FIGS. 25(b) and 27(b), horizontal lines indicate portions where the yielded region reaches by the increase of the horizontal force substantially simultaneously therewith. In either example, the damper body is integral with the base plate 42 extending around the damper body and is hollow centrally, with only its upper end closed by a reinforcing plate 43. The base plate 42 has a plurality of holes 44 through which a plurality of anchoring bolts 4 extend respectively. The nut 8 is threadedly mounted on the distal end of each anchoring bolt 4. Thus the base plate 42 is fixed to one confronting structural component 11. The connecting plate 5 is attached to the other structural component 12 and has a central aperture 6 in which the apex of the damper 41 is inserted so as to be restricted in horizontal motions. The connecting plate 5 is fixed to the other structural component 12 by the anchoring bolts 7 and the nuts 9, 10.

Figure 28:
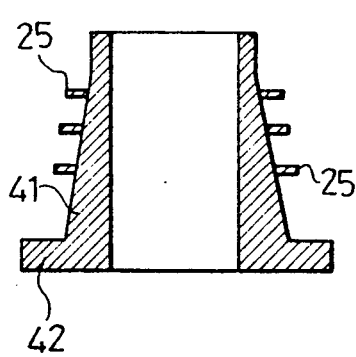
FIGS. 28 through 32 are vertical cross-sectional views of modifications of the cylinder-type damper, respectively.
Figure 29:
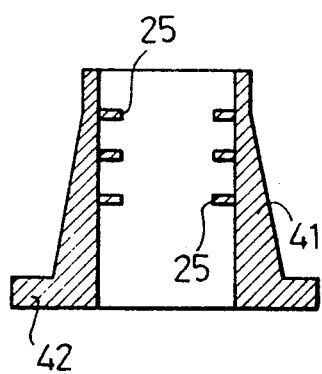
Figure 30:
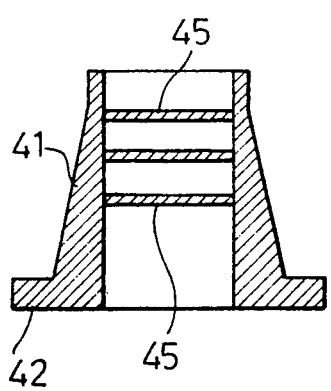

FIGS. 28 to 30 show modified elasto-plastic dampers 41 having on a peripheral surface of the body a plurality of horizontally extending fins 25 which serves to make the body resistant against elastic and plastic buckling and also serves to radiate heat created due to plastic deformation. These fins 25 may be only on the outer peripheral surface of the damper body as shown in FIG. 28, or may be only on the inner surface of the damper body as shown in FIG. 29. FIG. 30 shows another modified elasto-plastic damper 41 which has a plurality of horizontal plates 45 closing the cavity in the damper body.

Figure 31:
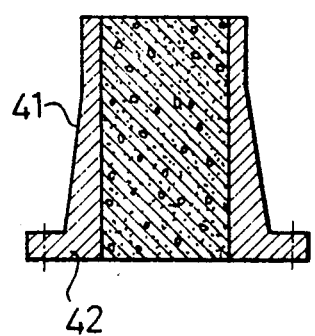

FIG. 31 shows a further modified elasto-plastic damper 41 in which, like the damper of FIG. 17, the cavity of the body is filled with concrete 26, which may be replaced with lead.

Figure 32:
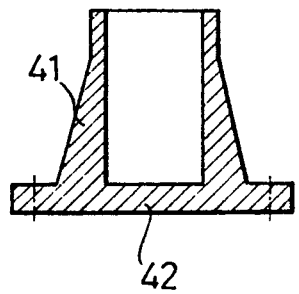

Though the base plate 42 has the central aperture, it may be non-apertured as shown in FIG. 32.

FIGS. 33(a) and 34 show cylinder-type elasto-plastic dampers 46 in which a pair of base plates 47 are disposed on upper and lower ends of the body, respectively, and are fixed to the respective confronting structural components. In this example, the damper body has a constant inner-diameter and also a varying wall thickness increasing progressively from the midportion toward the opposite base plates 47, so that its resisting moment is minimal around the midportion where the wall-thickness is minimal.

FIG. 35(a) shows a modified elasto-plastic damper 46 in which the small-diameter portion is slightly above the center of the body and which demonstrates a resisting moment as shown in FIG. 35(b).

FIG. 36(b) shows another modified elasto-plastic damper 46 in which, reverse to the damper of FIG. 33(a), the body has a constant outer-diameter and a varying wall-thickness increasing progressively from the midportion toward the opposite base plates 47.

Figure 37:
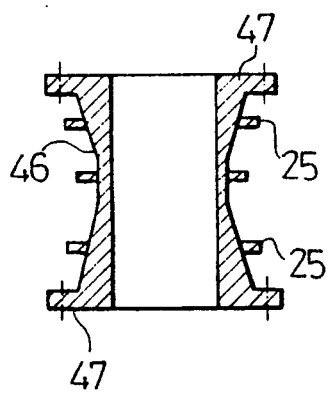
FIGS. 37 through 41 are vertical cross-sectional views of modifications of the cylinder-type damper of FIG. 33(a), respectively.
Figure 38:
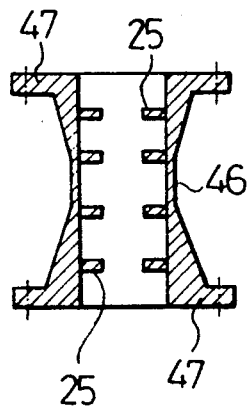
Figure 39:
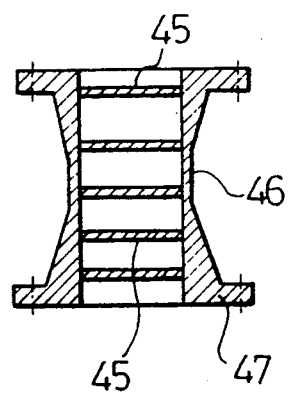

FIGS. 37 and 38, show further modified elasto-plastic dampers 46 having a plurality of horizontal fins 25 on the peripheral surface of the damper body. In the example of FIG. 37, the fins 25 are only on the outer peripheral surface of the damper body. In the example of FIG. 38, the fins 25 are only on the inner peripheral surface of the damper body. A further modified elasto-plastic damper 46 of FIG. 39 has a plurality of horizontal plates 45 closing the cavity in the damper body.

Figure 40:
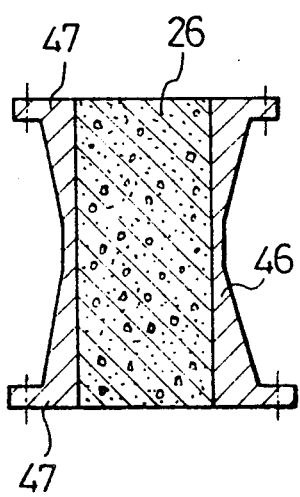
Figure 41:
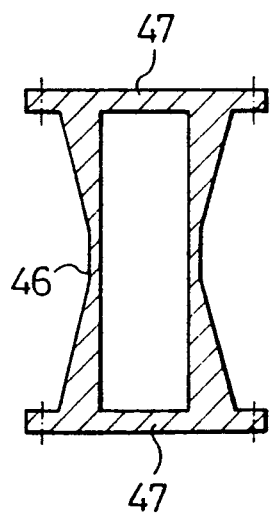

FIG. 40 shows a still further modified elasto-plastic damper 46 in which, unlike the damper of FIG. 33, the cavity of the body is filled with concrete 26, which may be replaced with lead. FIG. 41 shows an example in which each base plate 47 has no central aperture.

Figures 42A, 42B:
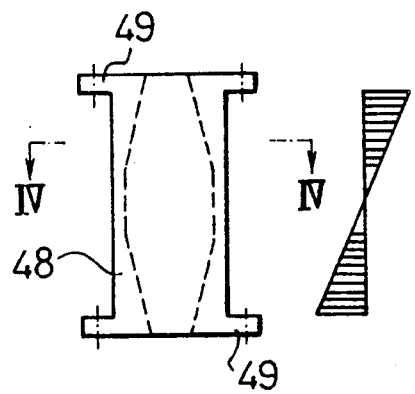
FIG. 42(a) is a front elevational view of an elasto-plastic damper in the shape of a tube of rectangular cross section.
FIG. 42(b) is a diagram showing resisting moment of the damper of FIG. 42(a)
Figure 43:
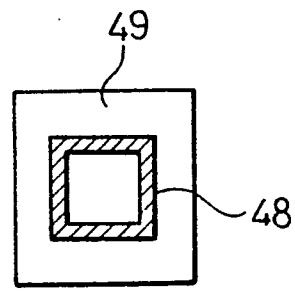
FIG. 43 is a cross-sectional view taken along line IV—IV of FIG. 42(a)

FIGS. 42(a) and 43 show an elasto-plastic damper 48 in the shape of a tube of rectangular cross section. The damper 48 has a pair of base plates 49 disposed on opposite ends of the tubular body and adapted to be fixed to the respective confronting structural components. This damper has a constant outer periphery and a varying wall-thickness increasing progressively from the midportion toward the opposite base plates 49 so that its resisting moment is minimal around the midportion where the wall-thickness is minimal. Unlike the foregoing dampers which are not directional and hence deformable uniformly in any direction, this damper 48 demonstrates a two-direction deformation characteristic. FIG. 44(a) shows a modified elastoplastic damper 48 which, reverse to the damper of FIG. 42(a), the body has a constant inner periphery and a varying wall-thickness increasing progressively from the midportion toward the opposite base plates 49. FIG. 45(a) shows another modified elasto-plastic damper 48 in which the body has a constant wall-thickness near the apex where the bending moment is small.

FIGS. 46 and 47 show further modified elasto-plastic dampers 48 having a plurality of horizontal fins 25 on the inner periphery of the damper body. FIG. 48 shows a still further modification in which the cavity of the damper body is filled with concrete 26, which may be replaced with lead. In an example of FIG. 49, each of the base plates 49 has no central aperture.

Figures 50A, 50B, 50C:
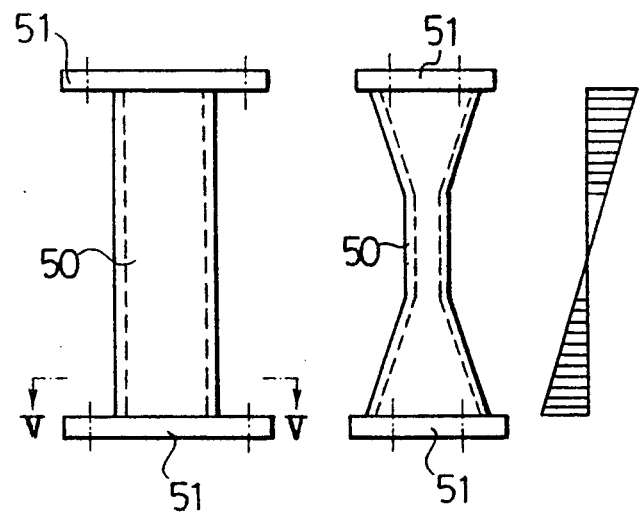
FIG. 50(a) is a side elevational view of an elasto-plastic damper in the shape of a hollow body of rectangular cross section.
FIG. 50(b) is a front elevational view of FIG. 50(a)
FIG. 50(c) is a diagram showing resisting moment of the damper of FIG. 50(a)
Figure 51:
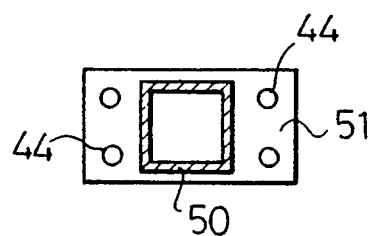
FIG. 51 is a cross-sectional view taken along line V—V of a FIG. 50(a)
Figures 52A, 52B, 53A, 53B:
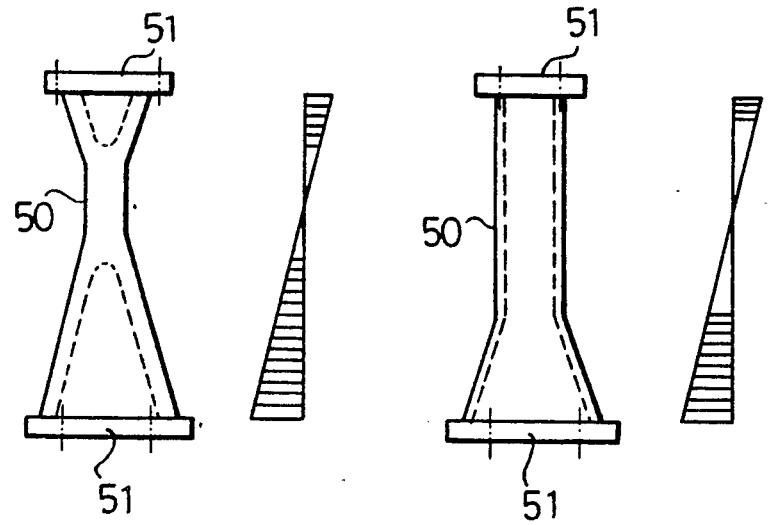
FIG. 52(a) is a front elevational view of modification of the damper of FIG. 50(a)
FIG. 52(b) is a diagram showing resisting moment of the damper of FIG. 52(a)
FIG. 53(a) is a front elevational view of another modification of the damper of FIG. 50(a)
FIG. 53(b) is a diagram showing resisting moment of the damper of FIG. 53(a)

FIGS. 50(a), 50(b) and 51 show elasto-plastic dampers 50 in the shape of a hollow body of rectangular cross section, respectively. One side of the damper body has a varying width increasing progressively from the midportion toward the opposite base plates 51. FIG. 50(c) shows a resisting moment of this damper 50. FIGS. 52 and 53 show modified elasto-plastic dampers 51 in which its bending moment is small near the apex of the body. In the example of FIG. 52, a pair of confronting side walls of the body are in contact with each other at a height slightly above the center at which height section modulus is minimal. In the example of FIG. 53, the damper body has a constant cross section from its midportion to the apex and also has a varying cross section increasing progressively from the midportion toward the lower base plate 51 so that the section modulus is maximal at the lower end of the damper body. FIGS. 52(b) and 53(b) show resisting moment diagrams of the dampers 51 of FIGS. 52(a) and 53(a), respectively.

Figures 54A, 54B, 54C:
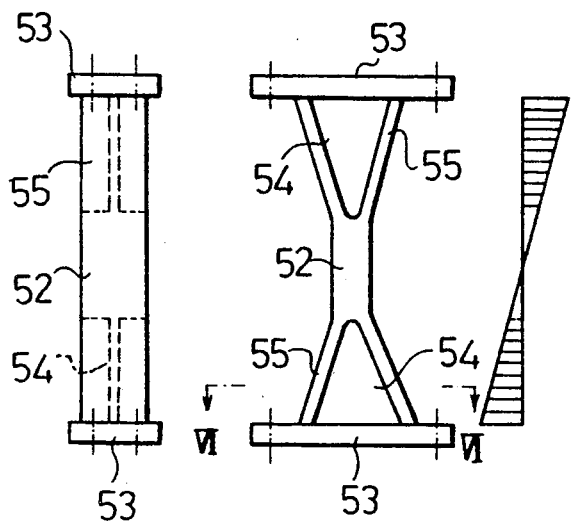
FIG. 54(a) is a side elevational view of an elasto-plastic damper of H-shaped cross section having a varying distance between flanges.
FIG. 54(b) is a front elevational view of FIG. 54(a)
FIG. 54(c) is a diagram showing resisting moment of the damper of FIG. 54(a)
Figure 55:
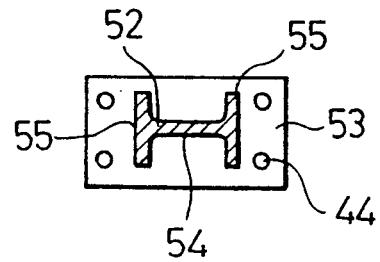
FIG. 55 is a cross-sectional view taken along line VI—VI of FIG. 54(b)
Figures 56A, 56B, 57A, 57B:
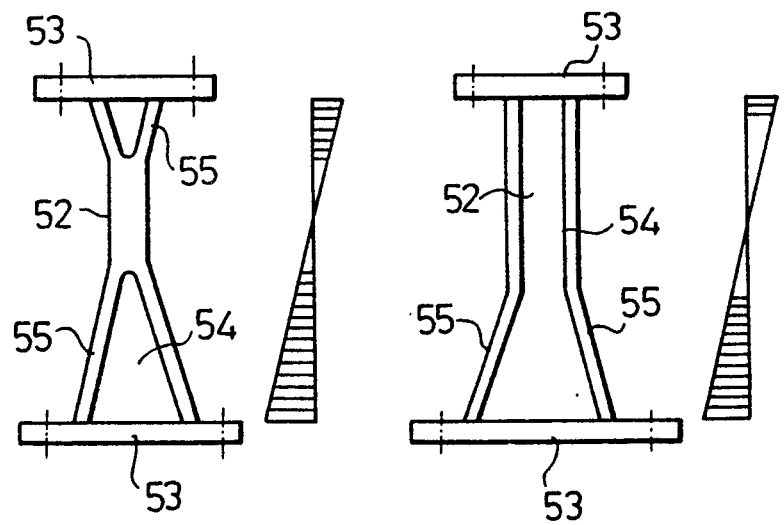
FIG. 56(a) is a front elevational view of a modification of the damper of FIG. 54(a)
FIG. 56(b) is a diagram showing resisting moment of the damper of FIG. 56(a)
FIG. 57(a) is a front elevational view of another modification of the damper of FIG. 54(a)
FIG. 57(b) is a diagram showing resisting moment of the damper of FIG. 57(a)
Figures 58A, 58B, 58C:
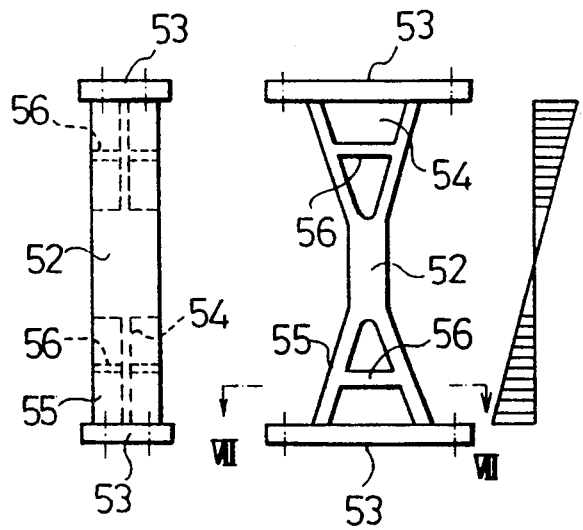
FIG. 58(a) is a side elevational view similar to FIG. 54(a), but showing an elasto-plastic damper having horizontal ribs.
FIG. 58(b) is a front elevational view of FIG. 58(a)
FIG. 58(c) is a diagram showing resisting moment of the damper of FIG. 58(a)
Figure 59:
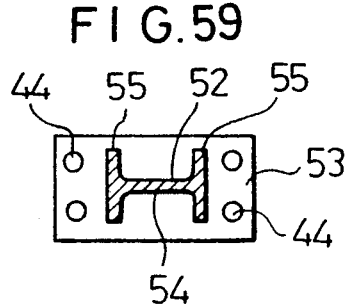
FIG. 59 is a cross-sectional view taken along line VII—VII of FIG. 58(b)
Figures 60A, 60B, 61A, 61B:
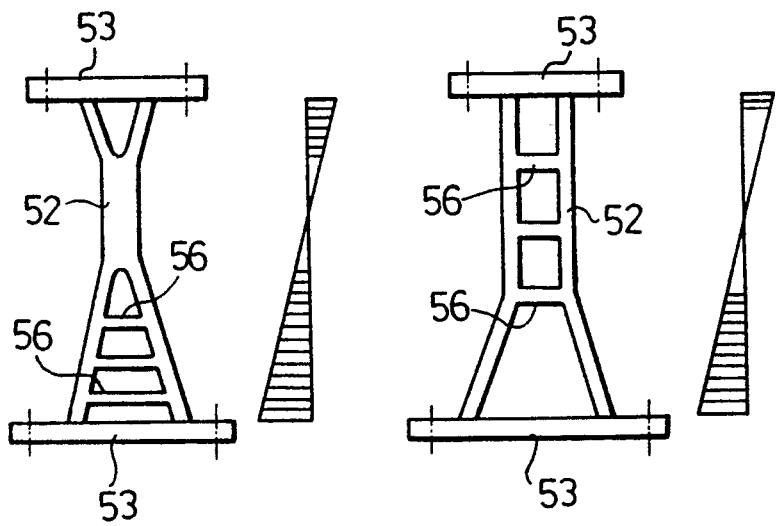
FIG. 60(a) is a front elevational view of a modification of the damper of FIG. 58(a)
FIG. 60(b) is a diagram showing resisting moment of the damper of FIG. 60(a)
FIG. 61(a) is a front elevational view of another modification of the damper of FIG. 58(a)
FIG. 61(b) is a diagram showing resisting moment of the damper of FIG. 61(a)

FIGS. 54(a), 54(b) and 55 show an elasto-plastic damper 52 of H-shaped cross section having flanges 55. A pair of base plates 53 are disposed on opposite ends of the damper body. The distance between the flanges 55 varies so as to increase progressively from the midportion toward the opposite base plates 53. The two flanges 55 are in contact with each other at the midportion where the section modulus is minimal. FIGS. 56(a) and 57(a) show modified elasto-plastic dampers 52 in which the bending moment is small near the apex of the body. In the example of FIG. 56(a), the confronting flanges 55 are in contact with each other at a height slightly above the center at which height section modulus is minimal. In the example of FIG. 57(a), the damper body has a constant cross section from its midportion to the apex and also a varying cross section increasing progressively from the midportion toward the lower base plate 51 so that the section modulus is maximal at the lower end of the body.

FIGS. 58(a), 58(b), 59, 60(a) and 61(b) show modified elasto-plastic dampers 52 similar to the dampers of FIGS. 54 to 57 except that a plurality of horizontal ribs 56 extend between the web 54 and the opposite flanges 55 in the manner similar to the embodiments of FIGS. 14 to 16.

Figures 62A, 62B, 62C:
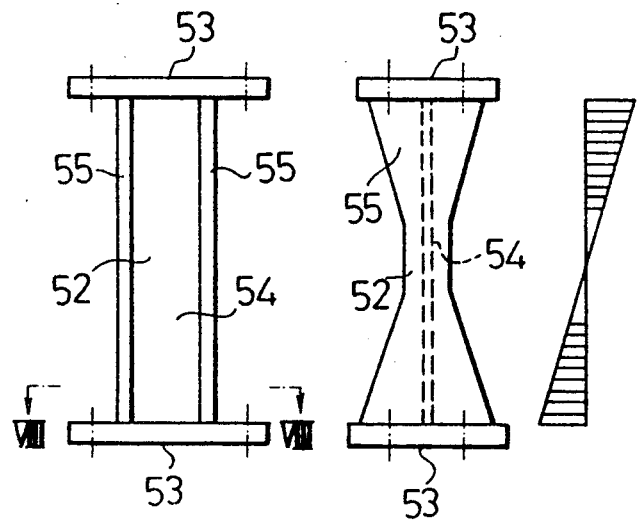
FIG. 62(a) is a side elevational view of an elasto-plastic damper of H-shaped cross-section having a varying width of flanges.
FIG. 62(b) is a front elevational view of FIG. 62(a)
FIG. 62(c) is a diagram showing resisting moment of the damper of FIG. 62(a)
Figure 63:
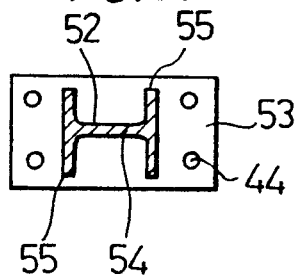
FIG. 63 is a cross-sectional view taken along line VIII—VIII of FIG. 62(a)
Figures 64A, 64B, 65A, 65B:
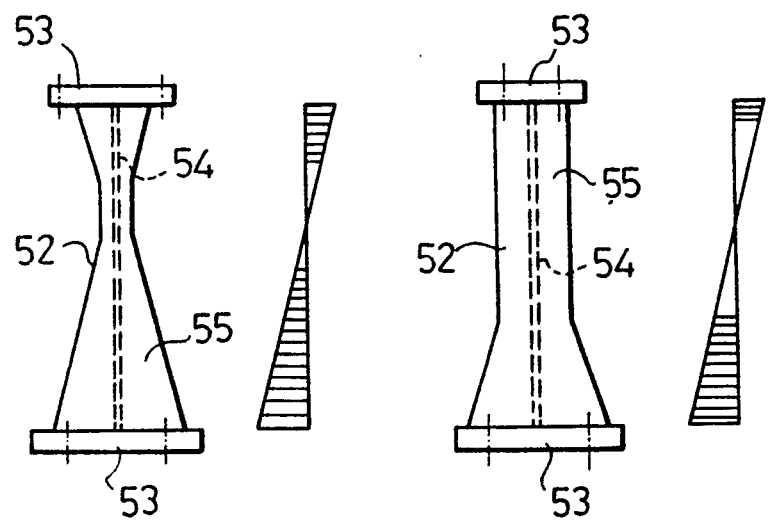
FIG. 64(a) is a front elevational view of a modification of the damper of FIG. 62(a)
FIG. 64(b) is a diagram showing resisting moment of the damper of FIG. 64(a)
FIG. 65(a) is a front elevational view of another modification of the damper of FIG. 62(a)
FIG. 65(b) is a diagram showing resisting moment of the damper of FIG. 65(a)

FIGS. 62 to 63 show an elasto-plastic damper 52 of H-shaped cross section having a pair of confronting flanges 55. A pair of top and bottom plates 53 and 53A, respectively, are disposed on opposite ends of the body. The flanges 55 have a varying width increasing progressively from the midportion toward the opposite plates 53 and 53A. FIGS. 64 and 65 show modified elasto-plastic dampers 52 in which its bending moment is small near the apex of the body. In the example of FIG. 64, the width of the flanges 55 is minimal at a height slightly above the center. In the example of FIG. 65, the width of the flanges 55 is constant from the midportion to the apex of the body and is maximal at the lower end of the body.

FIGS. 66 to 69 show elasto-plastic dampers 52 similar to the dampers 52 shown in FIGS. 62 to 65 except that a plurality of horizontal ribs 56 extend between the web 54 and the opposite flanges 55.

FIGS. 70 and 71 show an elasto-plastic damper 52 of H-shaped cross section having flanges of a varying thickness. A pair of top and bottom plates 53 and 53A are disposed on opposite ends of the damper body. The thickness of the flanges 55 varies so as to increase progressively from the midportion toward the opposite base plates 55. In this damper 52 of FIG. 70, the confronting flanges 55 are flat on their outer surfaces. Reversely, the confronting flanges 55 of the damper 52 of FIG. 72 are flat on their inner surfaces. FIG. 73 shows an example in which the flanges 55 have a constant thickness near the apex of the body where the bending moment is small. FIGS. 74 and 75 show modified elasto-plastic dampers 52 similar to the dampers of FIGS. 72 and 73 except that a plurality of horizontal ribs 56 extend between the web 54 and the flanges 55.

FIGS. 76 and 77 show an elasto-plastic damper 57 similar to the damper 52 of FIGS. 62 and 63 except that the body is composed of two parallel webs 59 and two confronting flanges 60. The flanges 60 has a varying width increasing progressively from the midportion toward the opposite base plates 58 so that the section modulus varies commensurate with the increase of the flange width. FIGS. 78 and 79 show modified elasto-plastic dampers 57. In the example of FIG. 78, the width of the flanges 60 is minimal at a height slightly above the center, and in the example of FIG. 79, the flange width is constant from the midportion to the apex of the body and is maximal at the lower end of the body.

FIGS. 80 to 83 show elasto-plastic dampers 61 in the shape of a plate. A base plate 62 is disposed on one end of the plate-like body. This plate-like body has a varying thickness increasing progressively toward the base plate 62 so that the section modulus in horizontal cross section increases toward the base plate 62. In the example of FIG. 80, only one side surface of the plate-like body is inclined. In the example of FIG. 81, the opposite surfaces of the plate-like body are inclined in opposite directions. In the examples of FIGS. 82 and 83, a horizontal projection 63 is formed integrally with the apex of the plate-like body. FIG. 84 shows a resisting moment diagram of the dampers of FIGS. 80 to 83.

This plate-like damper 61 demonstrates a one-directional deformation characteristic. Consequently, in order to cope with horizontal forces of different directions, a plurality of dampers 61 must be disposed in different directions.

FIGS. 85 to 88 show modified elasto-plastic dampers 64 in the shape of a plate. A pair of top and bottom plates 65 and 65A, respectively, are disposed on opposite ends of the plate-like body. This plate-like body has a varying thickness increasing progressively from the midportion toward the opposite plates 65 and 65A so that the section modulus in horizontal cross section increases toward the plates 65 and 65A. In the example of FIG. 85, the plate-like body is flat at one side surface and is tapered on the other side surface. In the example of FIG. 86, the plate-like body is tapered on both the opposite side surfaces. The dampers 64 of FIGS. 87 and 88 are similar to the dampers 64 of FIG. 85 and 86 except that a horizontal projection 66 is formed integrally with the midportion of the plate-like body. FIG. 89 shows a resisting moment diagram of the dampers 64 of FIGS. 85 to 88.

FIGS. 90(a) and 90(b) show a modified elasto-plastic damper 61 in the shape of a plate. The base plate 62 is disposed on one end of the plate-like body. This plate-like body has a varying width increasing progressively from the midportion toward the base plate 62 so that the section modulus in horizontal cross section increases toward the base plate 62. FIG. 90(c) shows a resisting moment diagram of the damper of FIG. 90(a). FIGS. 91(a) and 91(b) are modified elasto-plastic dampers 64 in the shape of a plate, respectively. A pair of top and bottom plates 65 and 65A are disposed on opposite ends of the plate-like body. This plate-like body has a varying width increasing progressively from the midportion toward the opposite base plates 65. FIG. 91(c) shows a resisting moment diagram of the damper 64 of FIG. 91(a).

What is claimed is:

1. An elasto-plastic damper means adapted to protect building structures by attenuating seismic tremors comprising: a steel load-bearing damper body having a top and a base; said damper body being adapted to support and to space apart a first structure member from a second structure member; said top being adapted to be rigidly secured to said first structure member; said base being adapted to be rigidly secured to said second structure member; and said damper body being deformable responsive to seismic tremors of a magnitude sufficient to stress said damper within its elastic limit and being plastically deformable responsive to seismic tremors of a magnitude sufficient to stress said damper beyond its elastic limit; said damper body comprising a pair of frusta joined at their minor diameters.

2. The elasto-plastic damper of claim 1, wherein said top and said base each include a laterally extending flange adapted to be secured to an adjacent structure member.

3. The elasto-plastic damper of claim 1, wherein the axial dimensions of said frusta are unequal.

4. The elasto-plastic damper of claim 1, wherein the axial dimensions of said frusta are equal.

5. The elasto-plastic damper of claim 1, wherein said frusta are hollow.

6. The elasto-plastic damper of claim 1, wherein said frusta are solid.

7. The elasto-plastic damper means of claim 5, wherein said hollow frusta are filled with a damping substance.

8. The elasto-plastic damper means of claim 5, wherein said hollow frusta are filled with an anti-buckling substance.

9. The elasto-plastic damper means of claim 5, wherein said hollow frusta are filled with an anti-buckling, damping substance.

10. An elasto-plastic damper means adapted to protect building structures by attenuating seismic tremors comprising: a steel load-bearing damper body having a top and a base; said damper body being adapted to support and to space apart a first structure member from a second structure member; said top being adapted to be rigidly secured to said first structure member; said base being adapted to be rigidly secured to said secon structure member; said damper body being deformable responsive to seismic tremors of a magnitude sufficient to stress said damper within its elastic limit and being plastically deformable responsive to seismic tremors of a magnitude sufficient to stress said damper beyond its elastic limit; said damper body tapering inwardly from both said base and from said top toward the midsection to define a pair of hollow frusta joined at their minor diameters; and said hollow frusta being filled with concrete.

11. An elasto-plastic damper means adapted to protect building structures by attenuating seismic tremors comprising: a steel load-bearing damper body having a top and a base; said damper body being adapted to support and to space apart a first structure member from a second structure member; said top being adapted to be rigidly secured to said first structure member; said base being adapted to be rigidly secured to said second structure member; said damper body being deformable responsive to seismic tremors of a magnitude sufficient to stress said damper within its elastic limit and being plastically deformable responsive to seismic tremors of a magnitude sufficient to stress said damper beyond its elastic limit; said damper body tapering inwardly from both said base and from said top toward the midsection to define a pair of hollow frusta joined at their minor diameters; said hollow frusta being filled with lead.

* * * * *